(12) United States Patent
Imai et al.

(10) Patent No.: US 9,575,297 B2
(45) Date of Patent: Feb. 21, 2017

(54) PROJECTION LENS AND PROJECTOR WITH MAGNIFYING FUNCTION

(71) Applicant: KONICA MINOLTA INC., Chiyoda-ku (JP)

(72) Inventors: Yusuke Imai, Osaka (JP); Kazuhiko Inoue, Sakai (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/950,760

(22) Filed: Nov. 24, 2015

(65) Prior Publication Data

US 2016/0154224 A1    Jun. 2, 2016

(30) Foreign Application Priority Data

Dec. 1, 2014    (JP) ................... 2014-242977

(51) Int. Cl.
*G02B 15/14*    (2006.01)
*G02B 15/177*    (2006.01)

(52) U.S. Cl.
CPC .................... *G02B 15/177* (2013.01)

(58) Field of Classification Search
CPC .................................................. G02B 15/177
USPC ........................................................ 359/680
See application file for complete search history.

(56) References Cited

U.S. PATENT DOCUMENTS 6,989,939 B2    1/2006  Yamasaki et al.
2015/0241669 A1*  8/2015  Amano ................ G02B 15/177
                                             359/680

FOREIGN PATENT DOCUMENTS

JP    2004-117519    4/2004
JP    2005-106948    4/2005

* cited by examiner

*Primary Examiner* — James Jones
(74) *Attorney, Agent, or Firm* — Cozen O'Connor

(57) ABSTRACT

A projection lens includes a first lens group having negative refractive power, a second lens group having positive refractive power, a third lens group having negative refractive power, a fourth lens group having negative refractive power, a fifth lens group having positive refractive power, and a sixth lens group having positive refractive power, in sequence from an enlargement conjugate side, the projection lens performing magnification by changing the spacing between the lens groups, wherein at the time of magnification from the telephoto end to the wide-angle end, the second, third, fourth, and fifth lens groups are moved, and an aperture stop is arranged between the surface of the third lens group closest to a reduction conjugate side and the surface of the fifth lens group closest to the enlargement conjugate side.

9 Claims, 21 Drawing Sheets

EX2

EX3

EX4

EX5

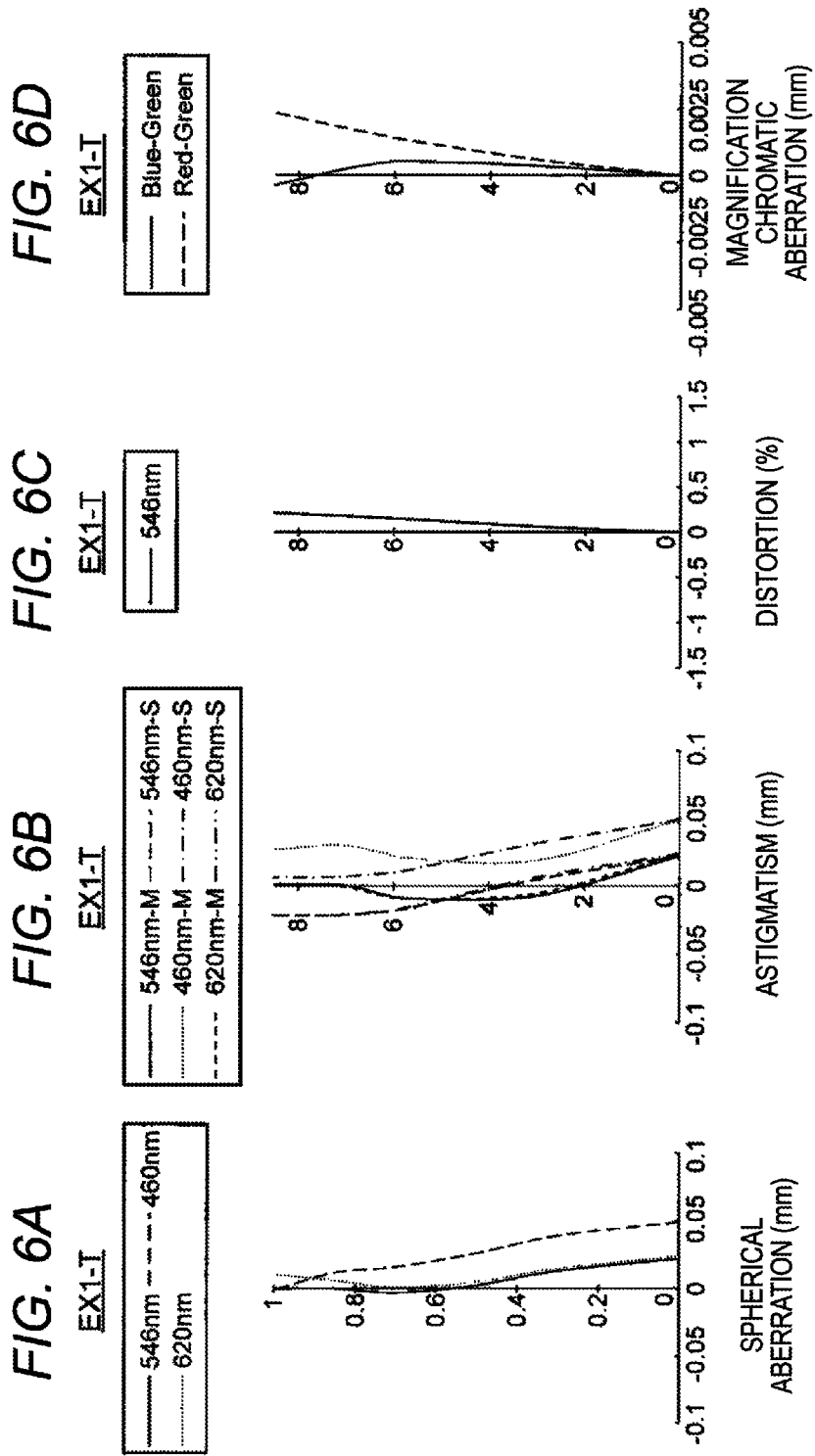

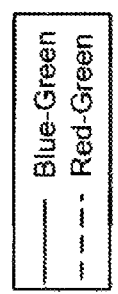
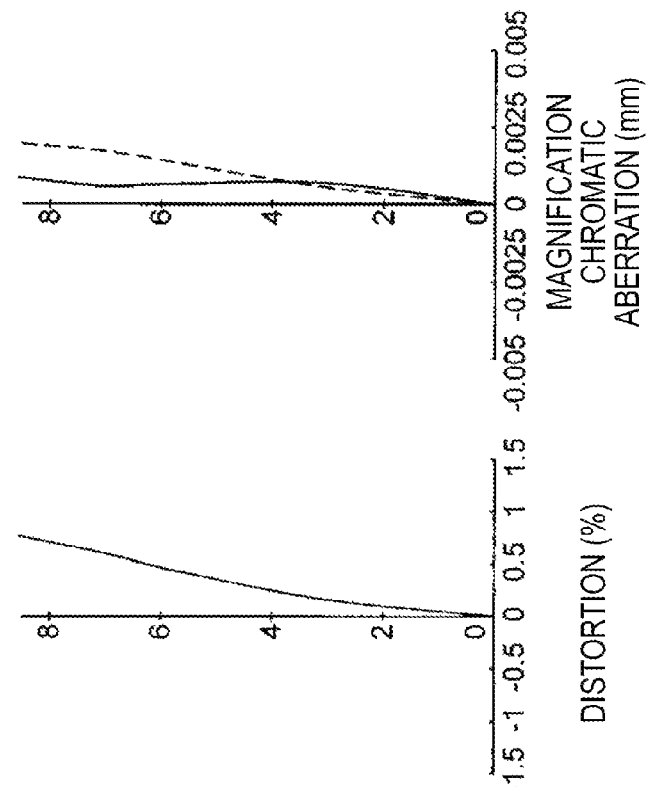
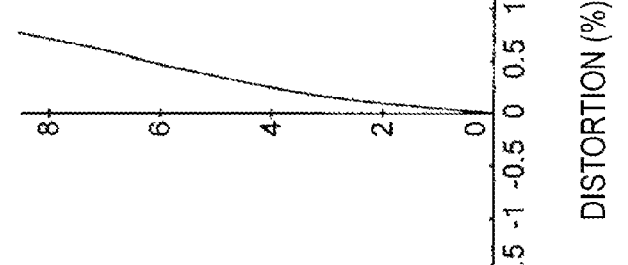
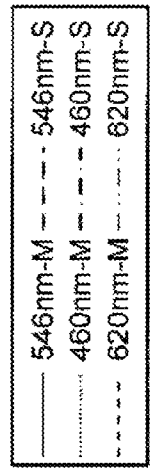
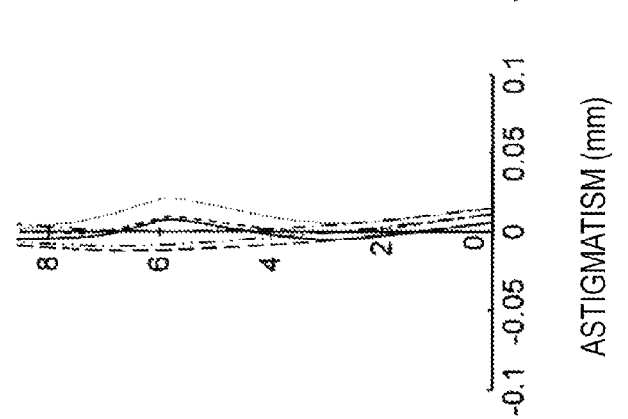
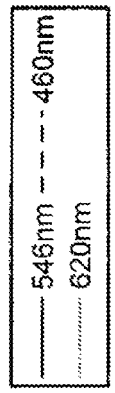
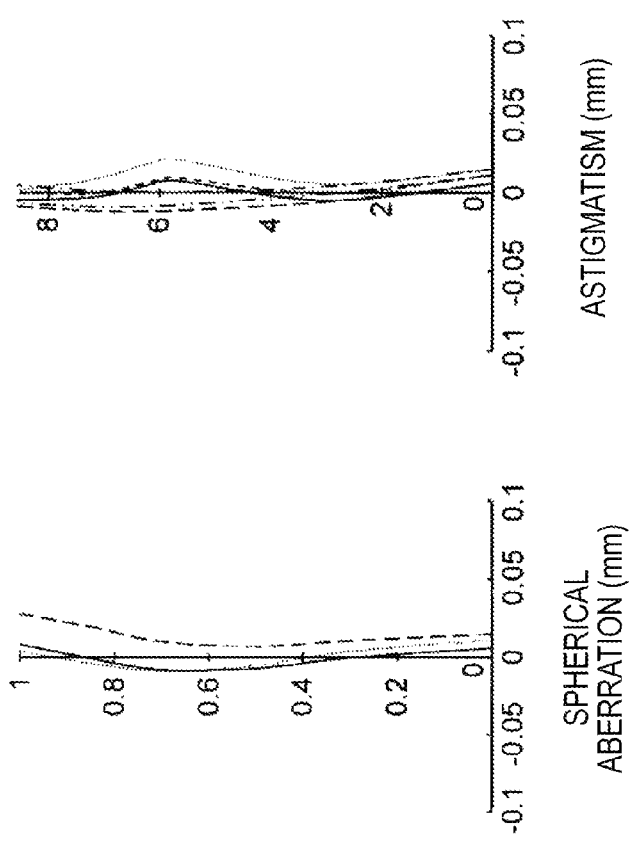

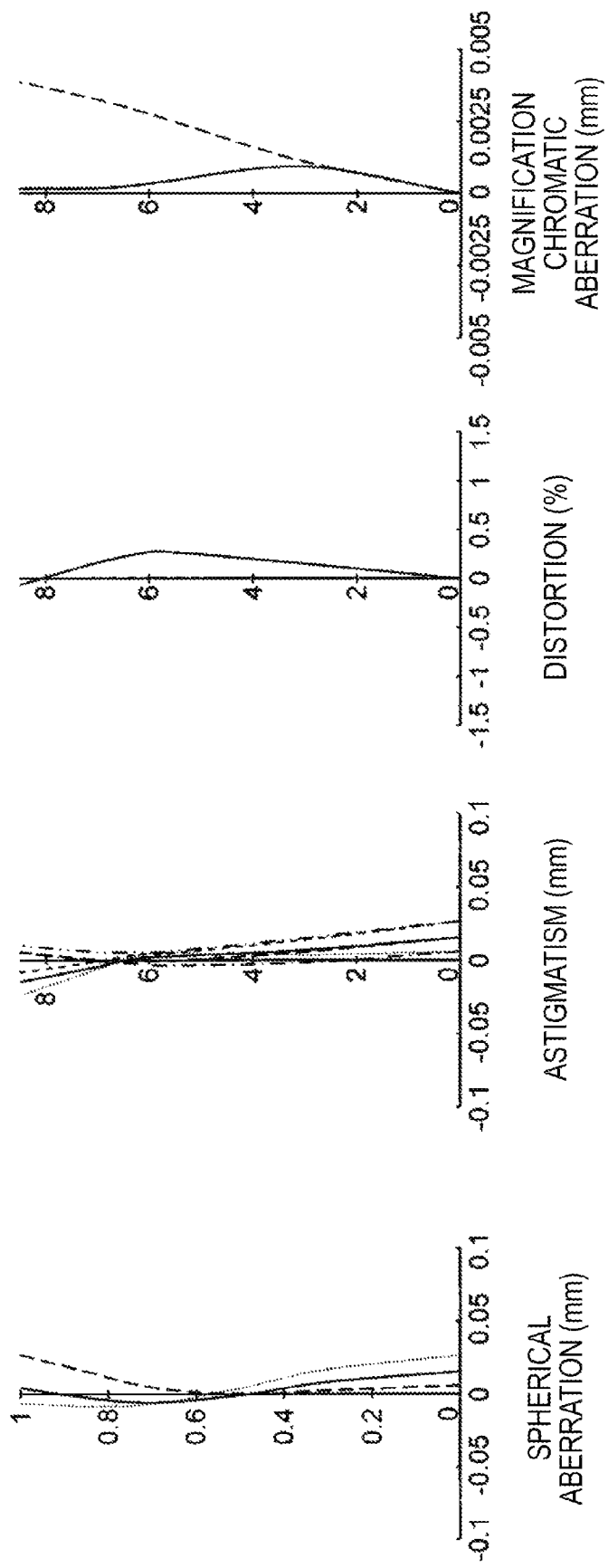

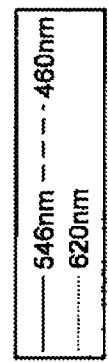
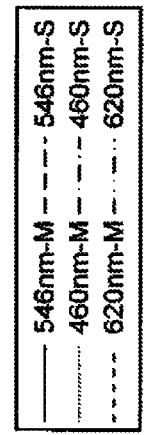
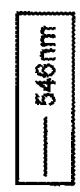
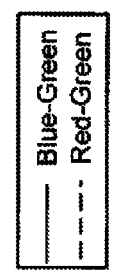
FIG. 9A EX2-I
FIG. 9B EX2-I
FIG. 9C EX2-I
FIG. 9D EX2-I

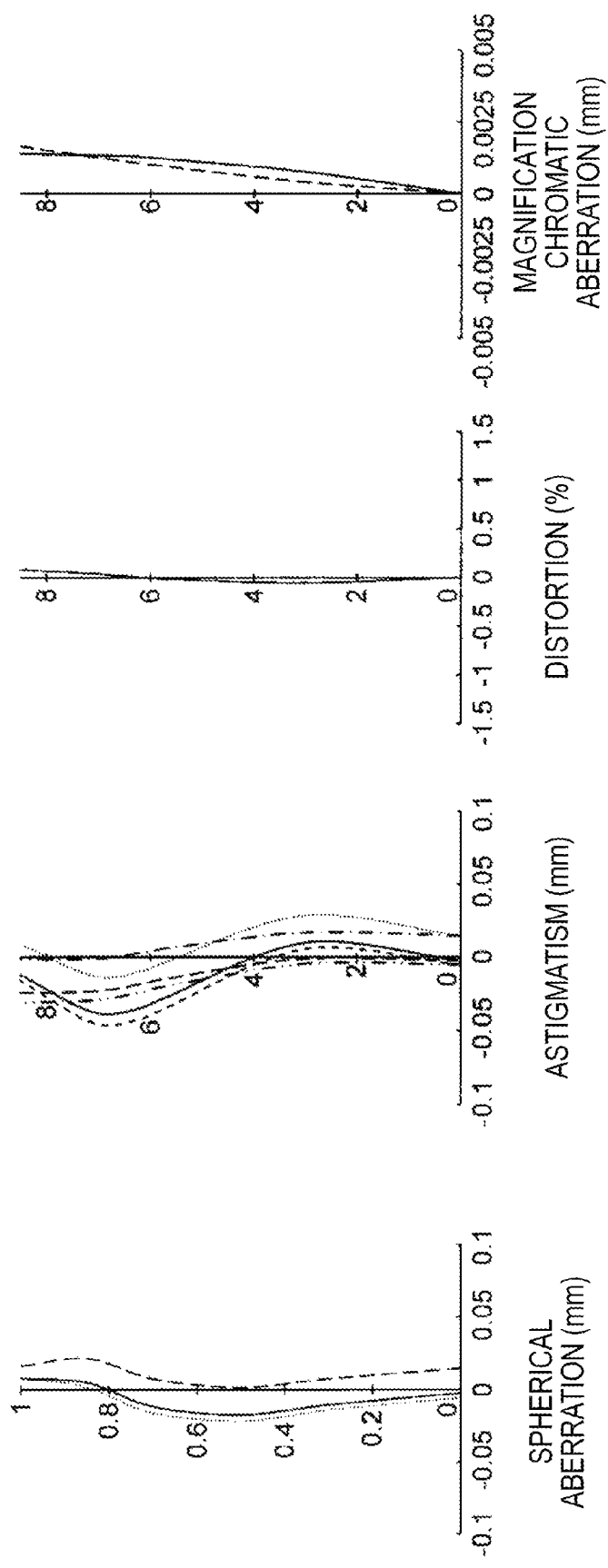

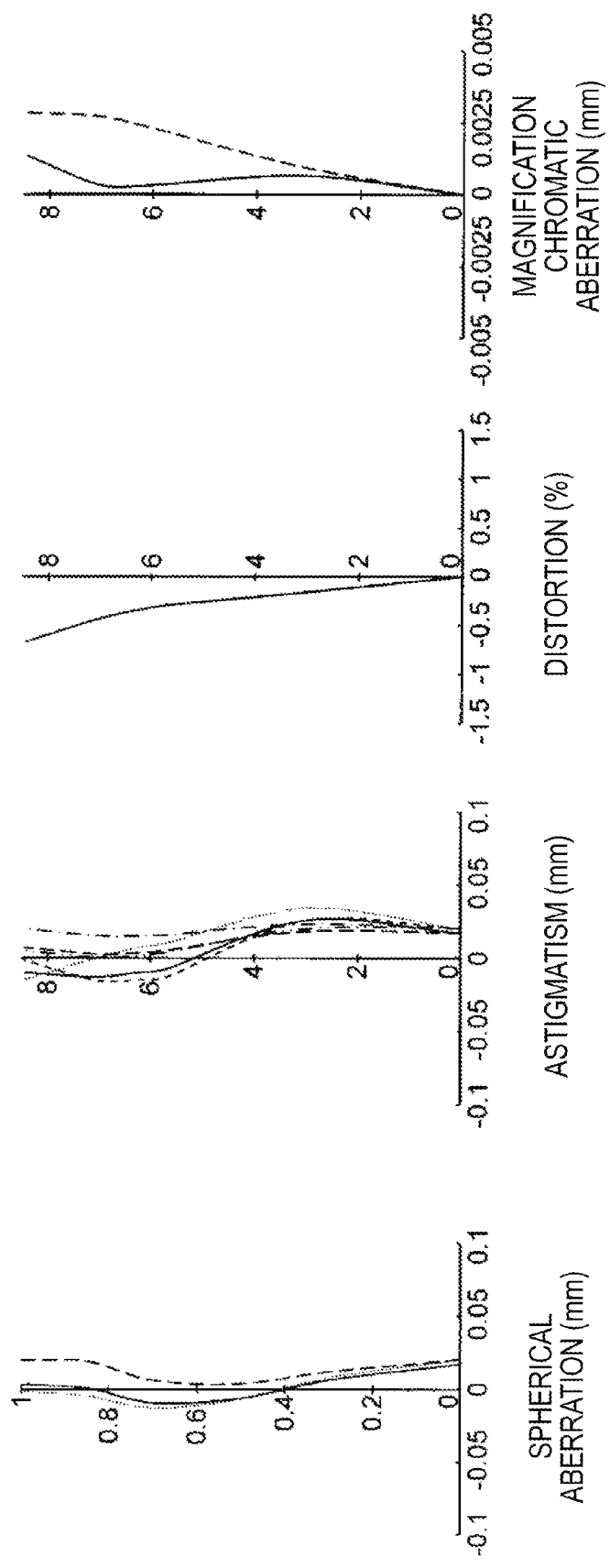

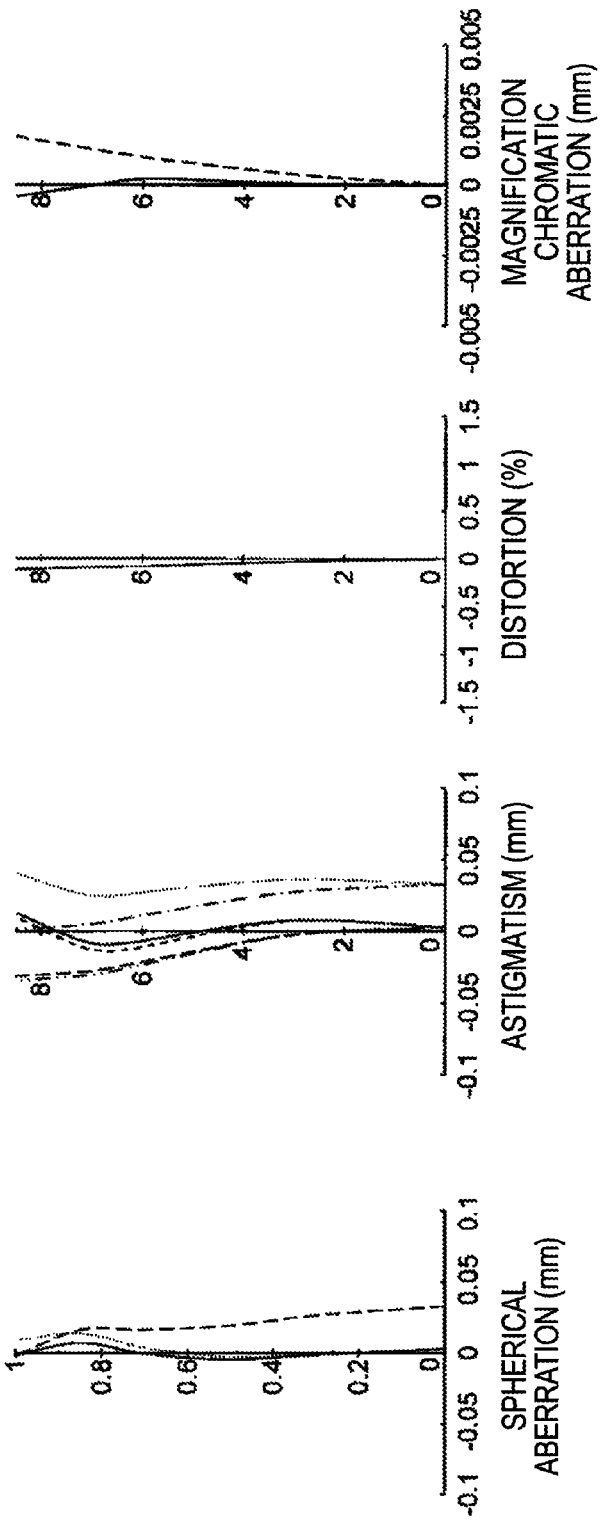

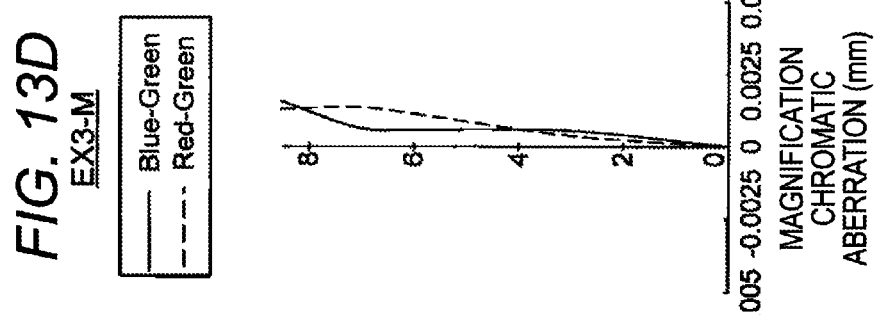
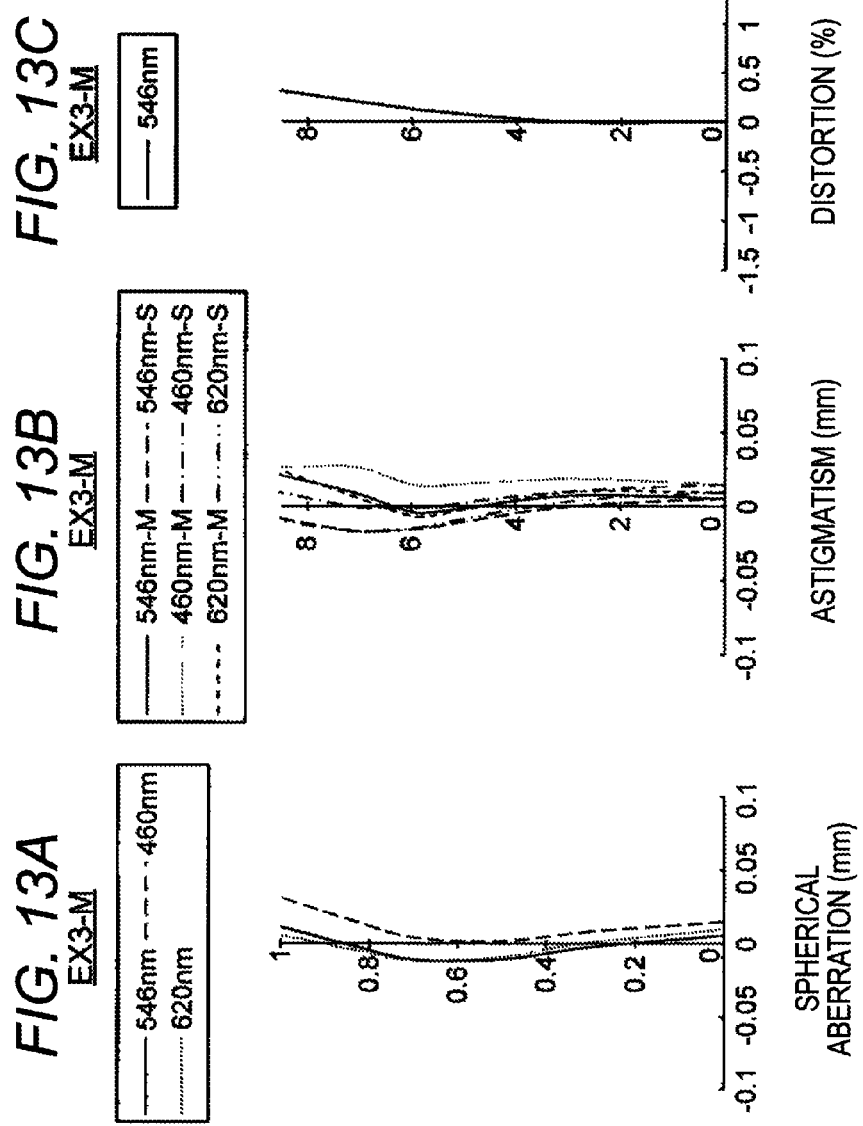

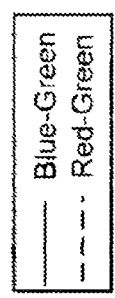
FIG. 14D EX3-W
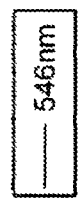
FIG. 14C EX3-W
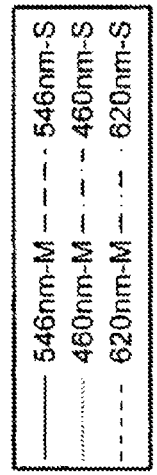
FIG. 14B EX3-W
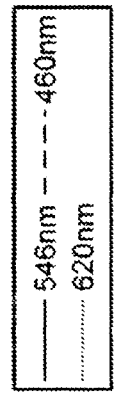
FIG. 14A EX3-W

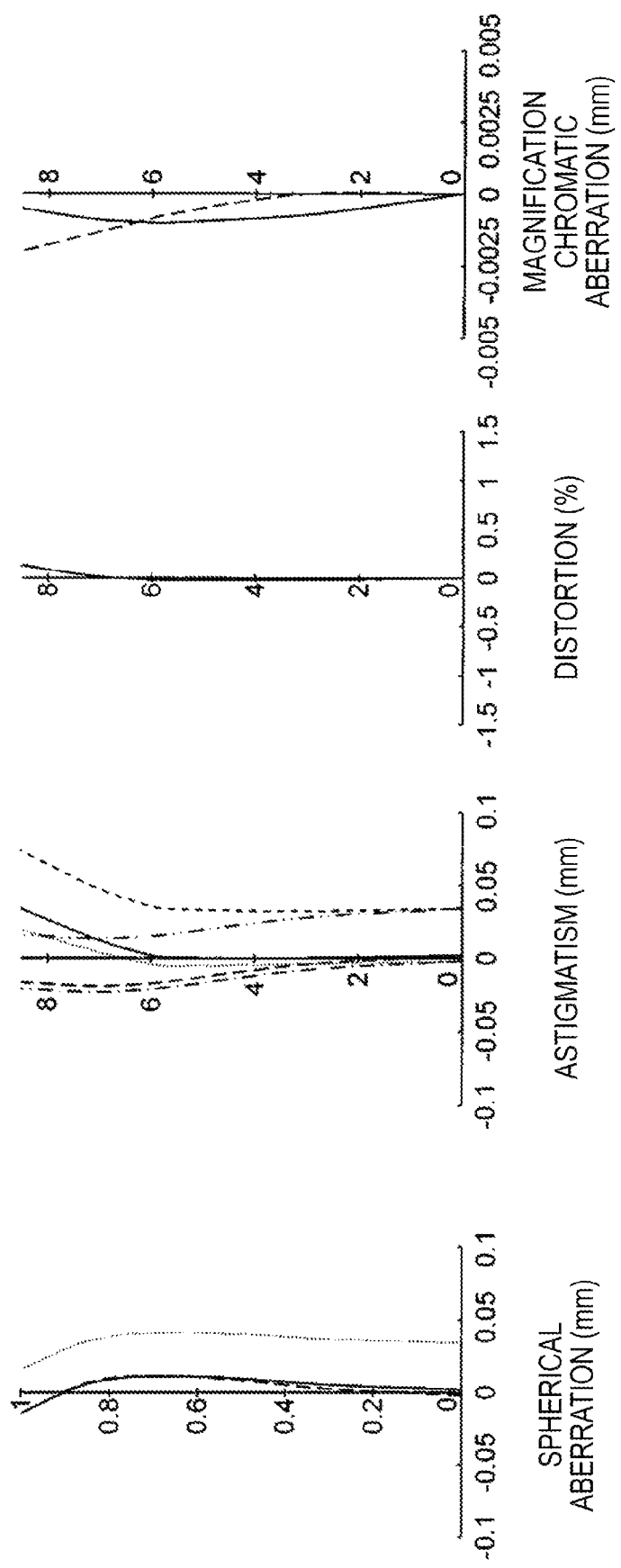
FIG. 15A EX4-T
FIG. 15B EX4-T
FIG. 15C EX4-T
FIG. 15D EX4-T

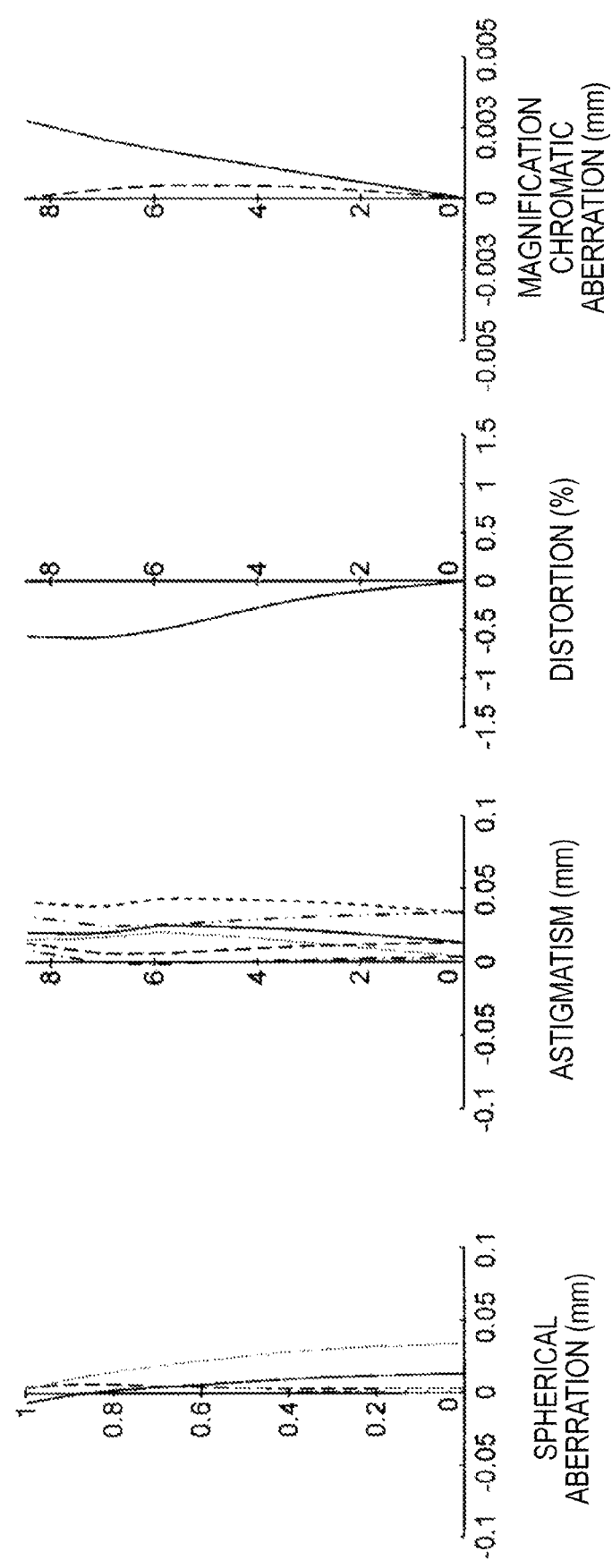

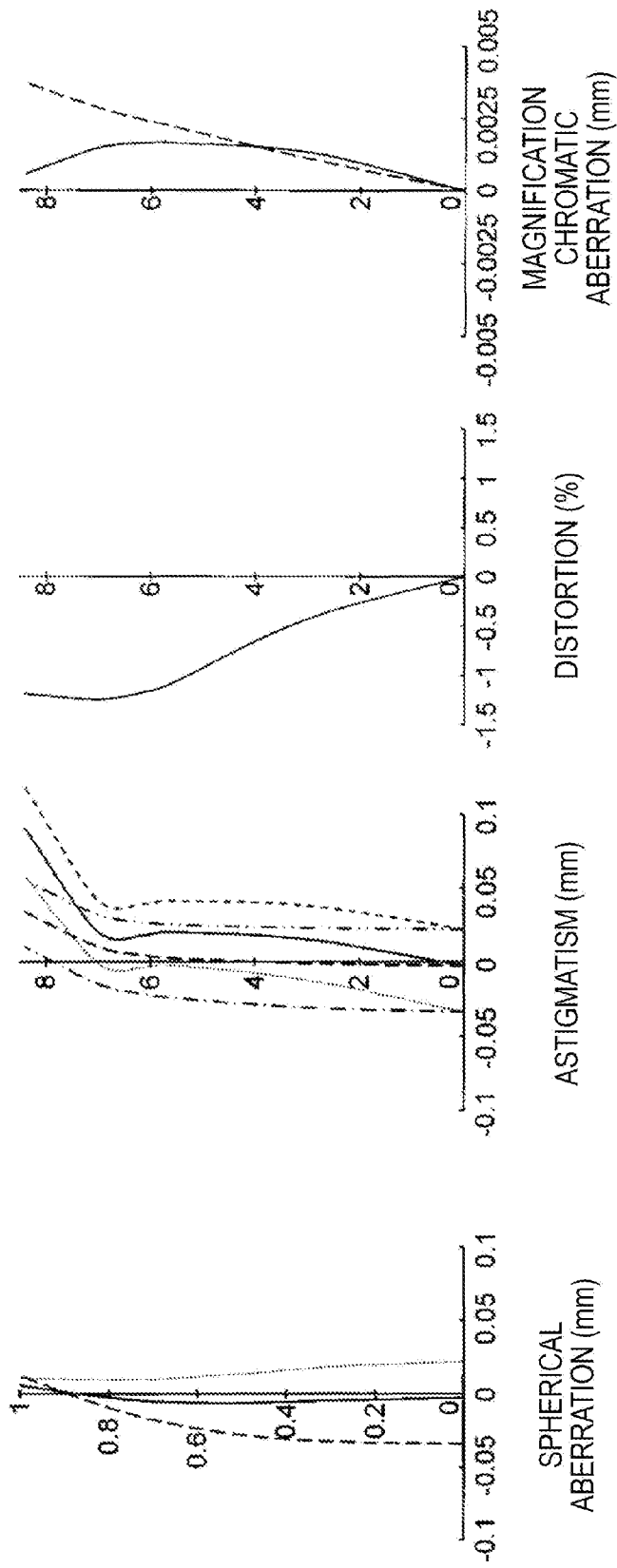

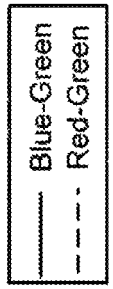
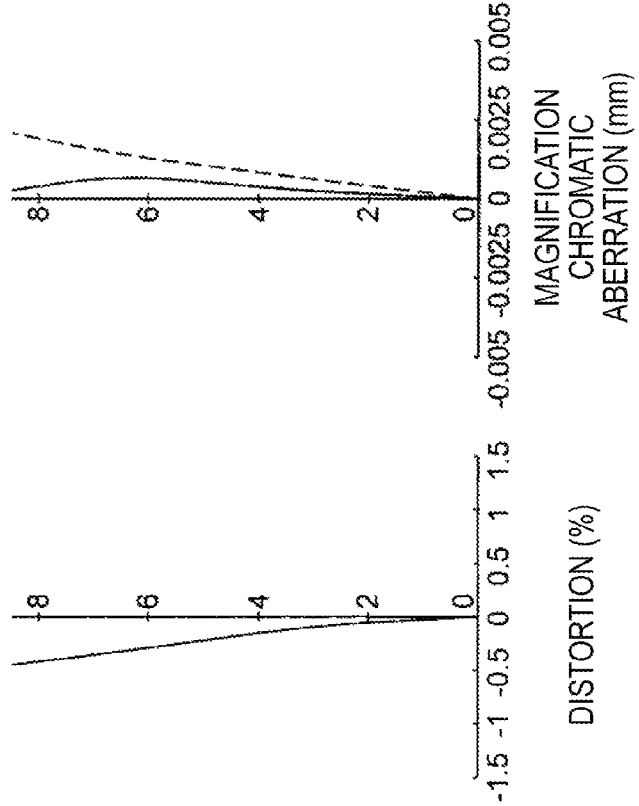
FIG. 18A EX5-T
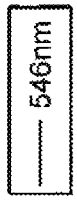
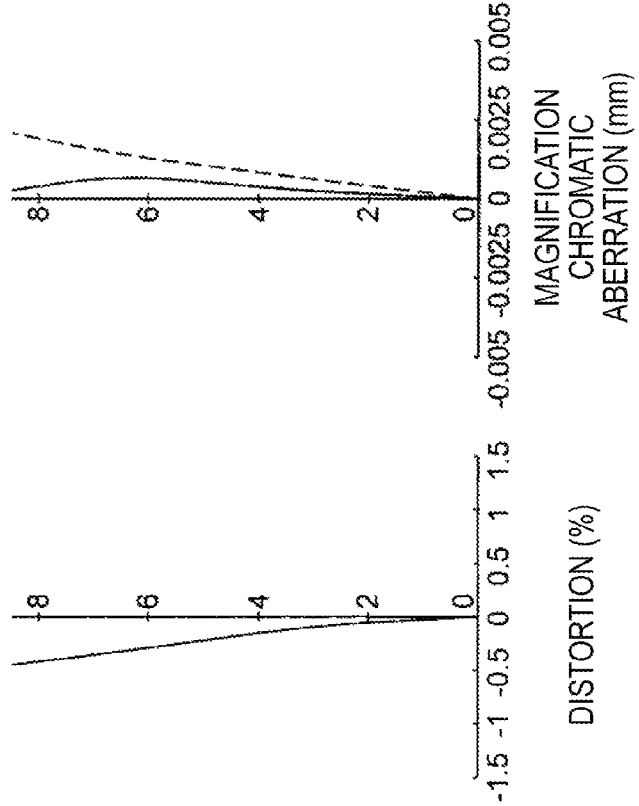
FIG. 18B EX5-T
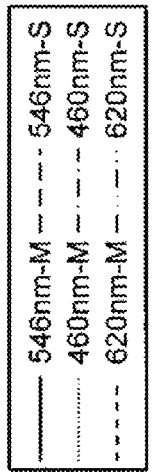
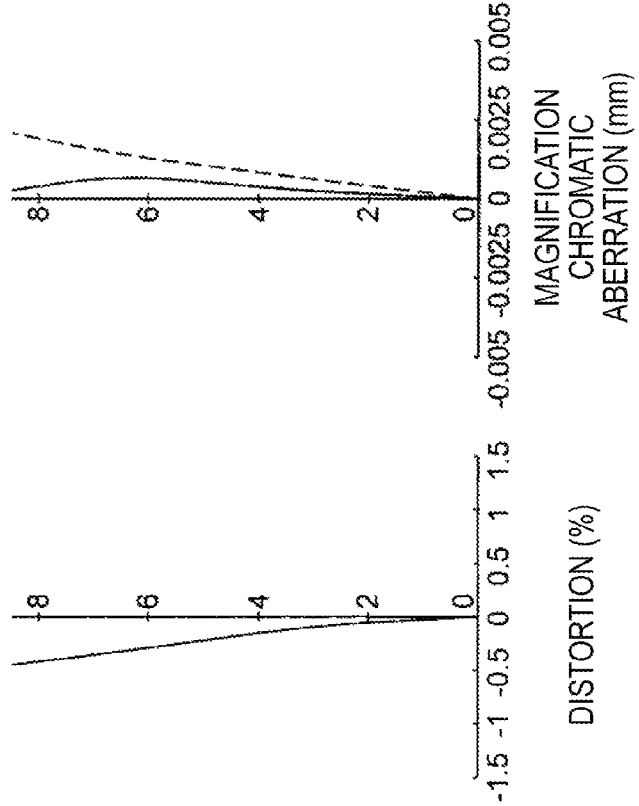
FIG. 18C EX5-T
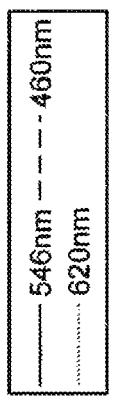
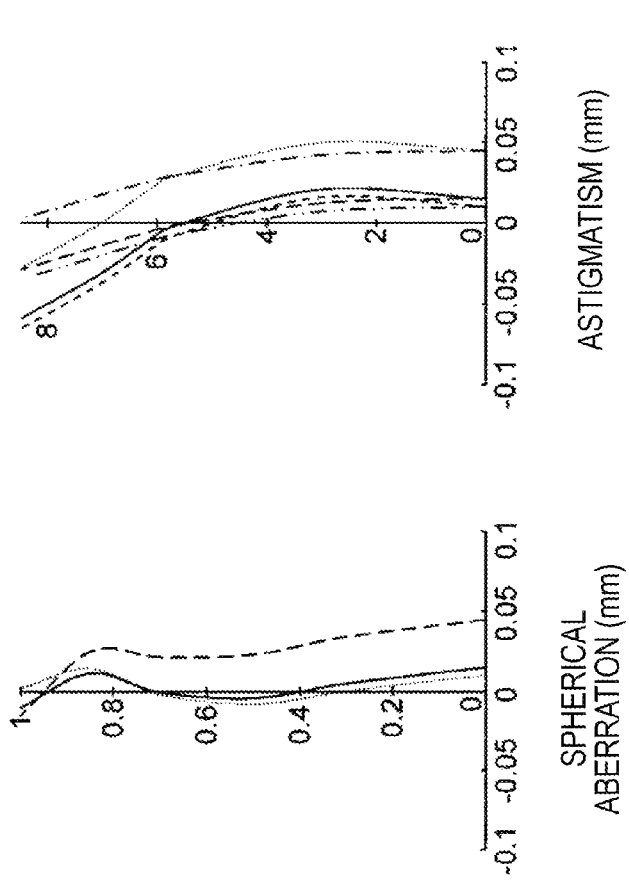
FIG. 18D EX5-T

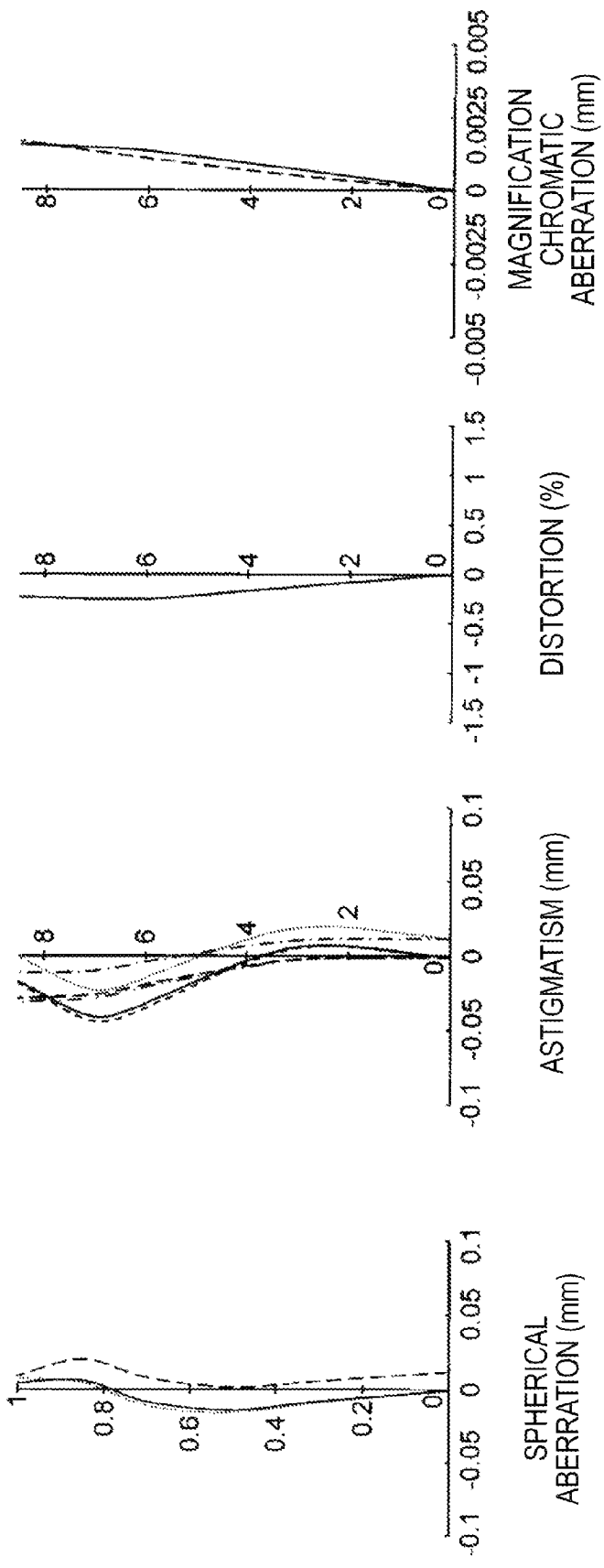
FIG. 19A EX5-M
FIG. 19B EX5-M
FIG. 19C EX5-M
FIG. 19D EX5-M

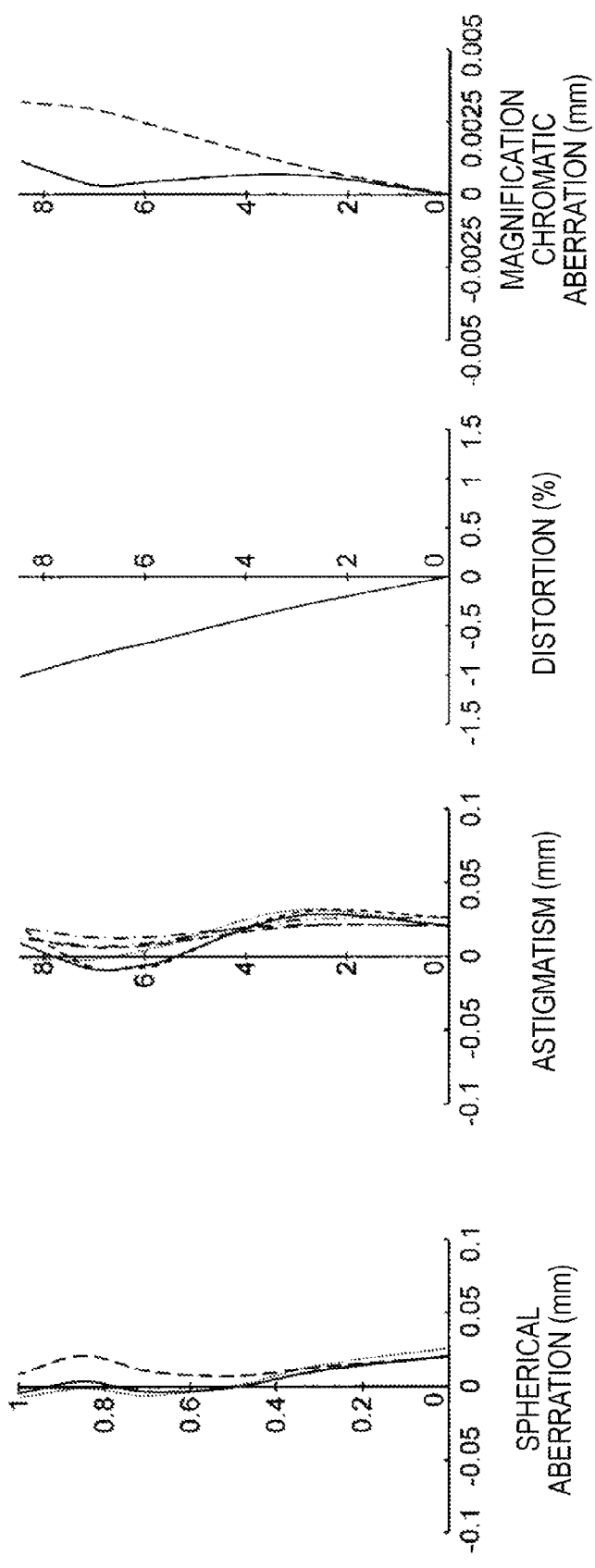

PROJECTION LENS AND PROJECTOR WITH MAGNIFYING FUNCTION

The entire disclosure of Japanese Patent Application No. 2014-242977 filed on Dec. 1, 2014 including description, claims, drawings, and abstract are incorporated herein by reference in its entirety.

BACKGROUND OF THE INVENTION

Field of the Invention

The present invention relates to a projection lens and a projector with a magnifying function. For example, the present invention relates to a wide-viewing-angle projection zoom lens suited to enlarge and project an image displayed on an image display element such as a digital micromirror device or an LCD (liquid crystal display) onto a screen, and a projector including the same.

Description of the Related Art

JP 2004-117519 A and JP 2005-106948 A propose zoom lenses suitable as projection lenses for projector. The zoom lenses described in JP 2004-117519 A and JP 2005-106948 A have four groups with negative, positive, negative, and positive lenses, five groups with negative, positive, negative, positive, and positive lenses, and six groups with negative, positive, negative, positive, positive, and positive lenses, or negative, positive, negative, negative, positive, and positive lenses. Therefore, the zoom lenses have a negative group-leading configuration in which the first lens group exerts negative refractive power, and they can be said to be useful as wider-angle projection lenses.

However, the zoom lenses described in JP 2004-117519 A and JP 2005-106948 A each have an about 1.2 magnification ratio that cannot be said to be a high value. In addition, many of the zoom lenses described in JP 2005-106948 A have a magnification chromatic aberration of about 10 to 15 μm. In the case of enlarging and projecting an image, the magnification chromatic aberration becomes significantly prominent, and the lenses cannot be said to be suited for projectors. When an attempt is made to achieve a high magnification ratio while correcting favorably the magnification chromatic difference, the amounts of movement of the respective lens groups become large to result in size increase of the projection lenses.

SUMMARY OF THE INVENTION

The present invention has been made in view of the foregoing circumferences. An object of the present invention is to provide a projection lens that has high aberration performance and high magnification ratios corresponding to high-definition image display elements and achieves size reduction, and a projector including the projection lens.

To achieve the abovementioned object, according to an aspect, a projection lens reflecting one aspect of the present invention comprises a first lens group having negative refractive power, a second lens group having positive refractive power, a third lens group having negative refractive power, a fourth lens group having negative refractive power, a fifth lens group having positive refractive power, and a sixth lens group having positive refractive power, in sequence from an enlargement conjugate side, the projection lens performing magnification by changing the spacing between the lens groups, wherein at the time of magnification from the telephoto end to the wide-angle end, the second, third, fourth, and fifth lens groups are moved, an aperture stop is arranged between the surface of the third lens group closest to a reduction conjugate side and the surface of the fifth lens group closest to the enlargement conjugate side, and the following conditional expressions (1) and (2) are satisfied:

$$4.0 < bf/fw \tag{1}$$

$$0.462 < dx/f2 < 0.605 \tag{2}$$

where
bf: Air-converted back focus from the rearmost lens surface to an image plane,
fw: Focal length of the entire projection lens at the wide-angle end,
dx: Amount of movement of the second lens group at the time of magnification from the telephoto end to the wide-angle end, and
f2: Focal length of the second lens group.

According to the projection lens of Item. 2, in Item. 1, the following conditional expression (3) is preferably satisfied:

$$1.000 < \phi34\text{min}/\phi34\text{max} < 1.160 \tag{3}$$

where
φ34min: Minimum value of synthetic refractive power of the third lens group and the fourth lens group in the entire magnification range, and
φ34max: Maximum value of synthetic refractive power of the third lens group and the fourth lens group in the entire magnification range.

According to the projection lens of Item. 3, in Item. 1 or 2, at the time of magnification from the telephoto end to the wide-angle end, the third lens group preferably moves to the enlargement conjugate side and then makes a U turn to the reduction conjugate side.

According to the projection lens of Item. 4, in any one of Items. 1 to 3, the third lens group preferably consists of lenses with negative refractive power.

According to the projection lens of Item. 5, in any one of Items. 1 to 4, at least one of the lenses with negative refractive power included in the third lens group and the fourth lens group preferably satisfies the following conditional expressions (4) and (5):

$$0.645 < \theta g\_F + 0.001682 \times vd < 0.695 \tag{4}$$

$$60 < vd < 100 \tag{5}$$

where
θg_F: Partial dispersion ratio of lens material $$\theta g\_F = (Ng - NF)/(NF - NC)$$

Ng: Refractive index relative to g line,
NF: Refractive index relative to F line,
NC: Refractive index relative to C line, and
vd: Abbe number of lens material.

According to the projection lens of Item. 6, in any one of Items. 1 to 5, the fourth lens group preferably includes cemented lenses including a lens with negative refractive power and a lens with positive refractive power in sequence from the enlargement conjugate side.

According to the projection lens of Item. 7, in any one of Items. 1 to 6, the first lens group preferably includes an aspherical lens.

According to the projection lens of Item. 8, in Item. 7, the material for the aspherical lens included in the first lens group is preferably a resin material.

A projector of Item. 9 preferably comprises: an image forming element that forms image light; and the projection lens of any one of Items. 1 to 8 that enlarges and projects the image light.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIGS. 6A to 6D are diagrams illustrating aberrations at a telephoto end in Example 1;

FIGS. 7A to 7D are diagrams illustrating aberrations at a middle position in Example 1;

FIGS. 8A to 8D are diagrams illustrating aberrations at a wide-angle end in Example 1;

FIGS. 9A to 9D are diagrams illustrating aberrations at a telephoto end in Example 2;

FIGS. 10A to 10D are diagrams illustrating aberrations at a middle position in Example 2;

FIGS. 11A to 11D are diagrams illustrating aberrations at a wide-angle end in Example 2;

FIGS. 12A to 12D are diagrams illustrating aberrations at a telephoto end in Example 3;

FIGS. 13A to 13D are diagrams illustrating aberrations at a middle position in Example 3;

FIGS. 14A to 14D are diagrams illustrating aberrations at a wide-angle end in Example 3;

FIGS. 15A to 15D are diagrams illustrating aberrations at a telephoto end in Example 4;

FIGS. 16A to 16D are diagrams illustrating aberrations at a middle position in Example 4;

FIGS. 17A to 17D are diagrams illustrating aberrations at a wide-angle end in Example 4;

FIGS. 18A to 18D are diagrams illustrating aberrations at a telephoto end in Example 5;

FIGS. 19A to 19D are diagrams illustrating aberrations at a middle position in Example 5;

FIGS. 20A to 20D are diagrams illustrating aberrations at a wide-angle end in Example 5.

DESCRIPTION OF THE PREFERRED EMBODIMENTS

Figure 1:
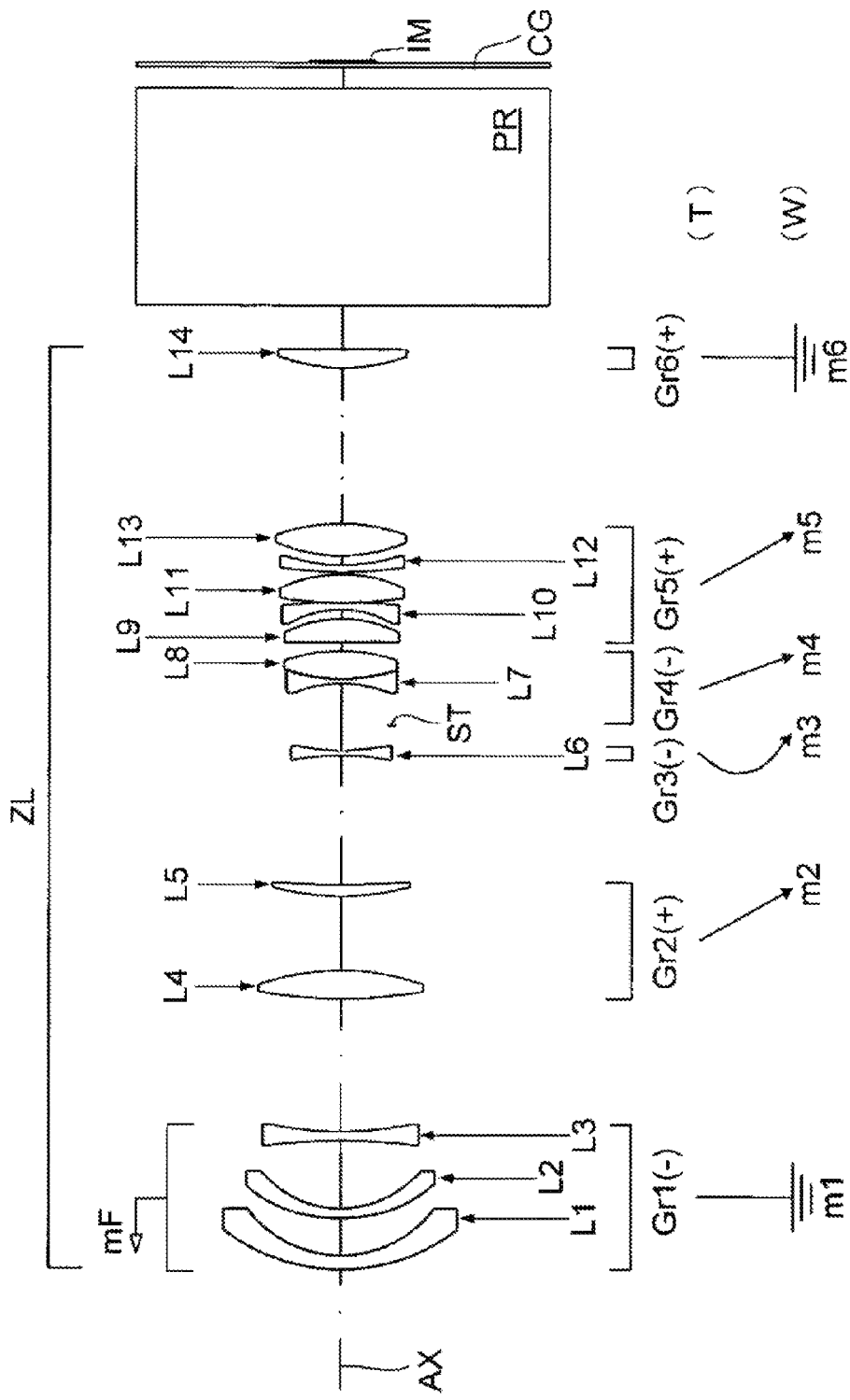
FIG. 1 is a lens configuration diagram of a first embodiment (Example 1)
Figure 2:
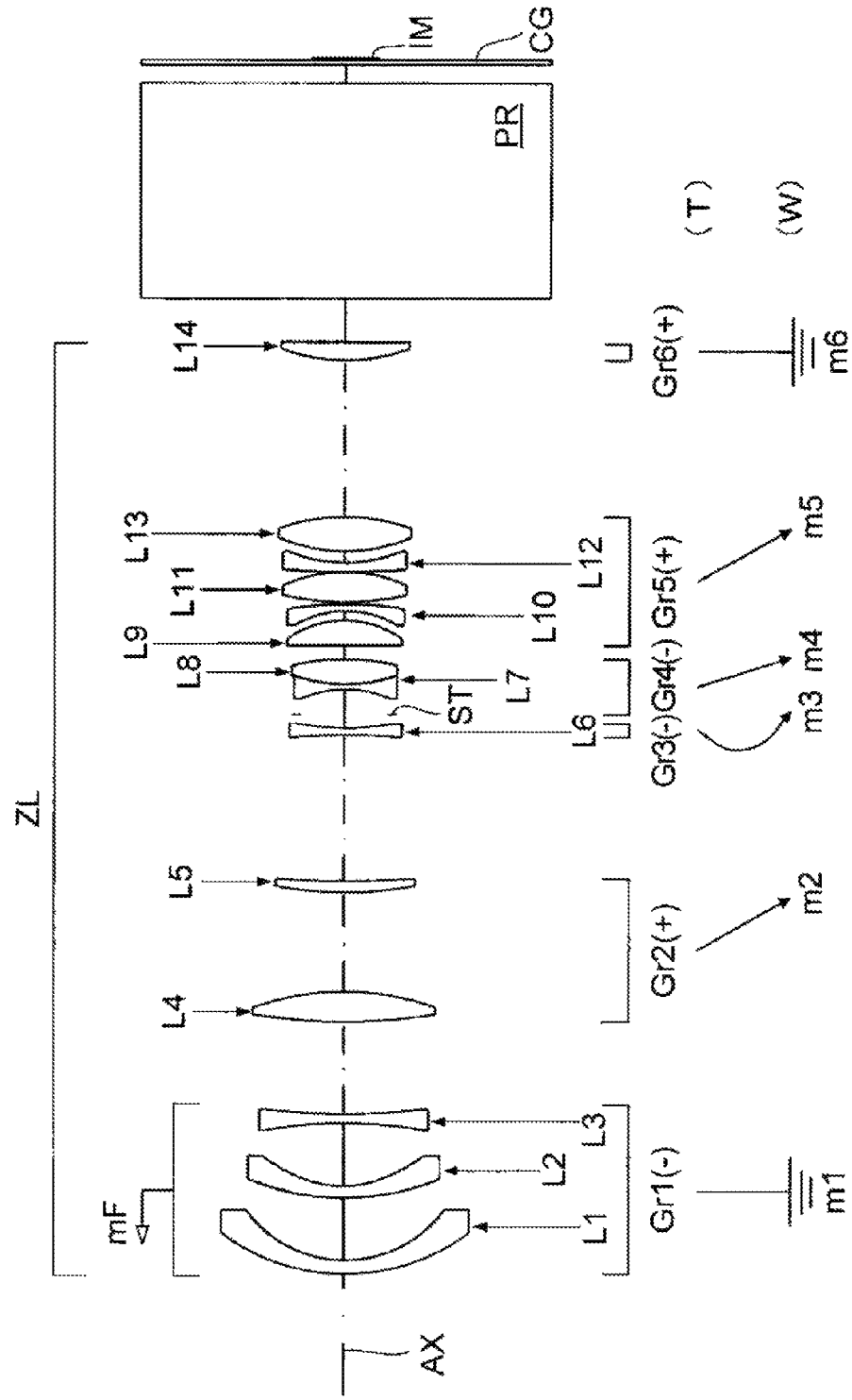
FIG. 2 is a lens configuration diagram of a second embodiment (Example 2)
Figure 3:
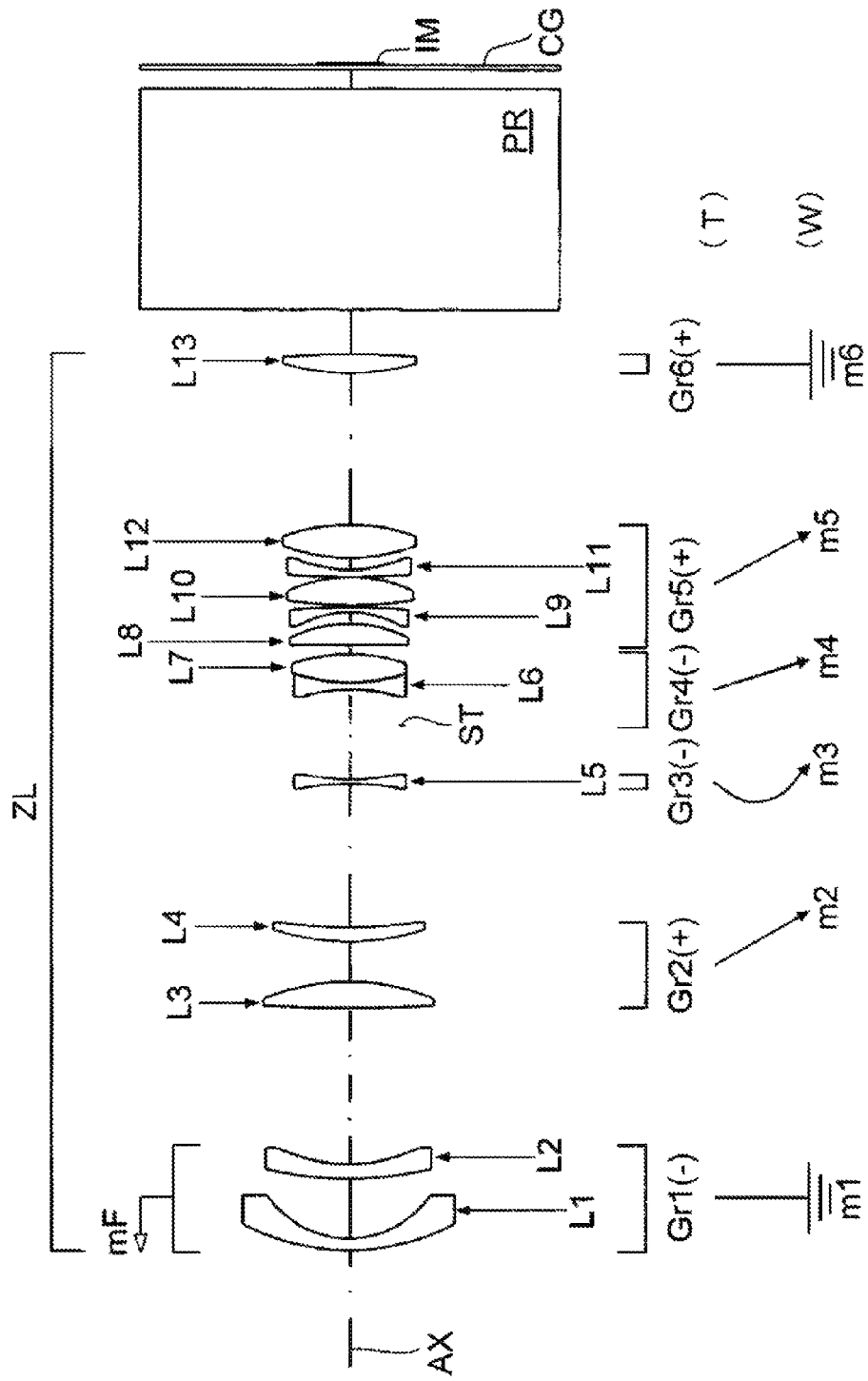
FIG. 3 is a lens configuration diagram of a third embodiment (Example 3)
Figure 4:
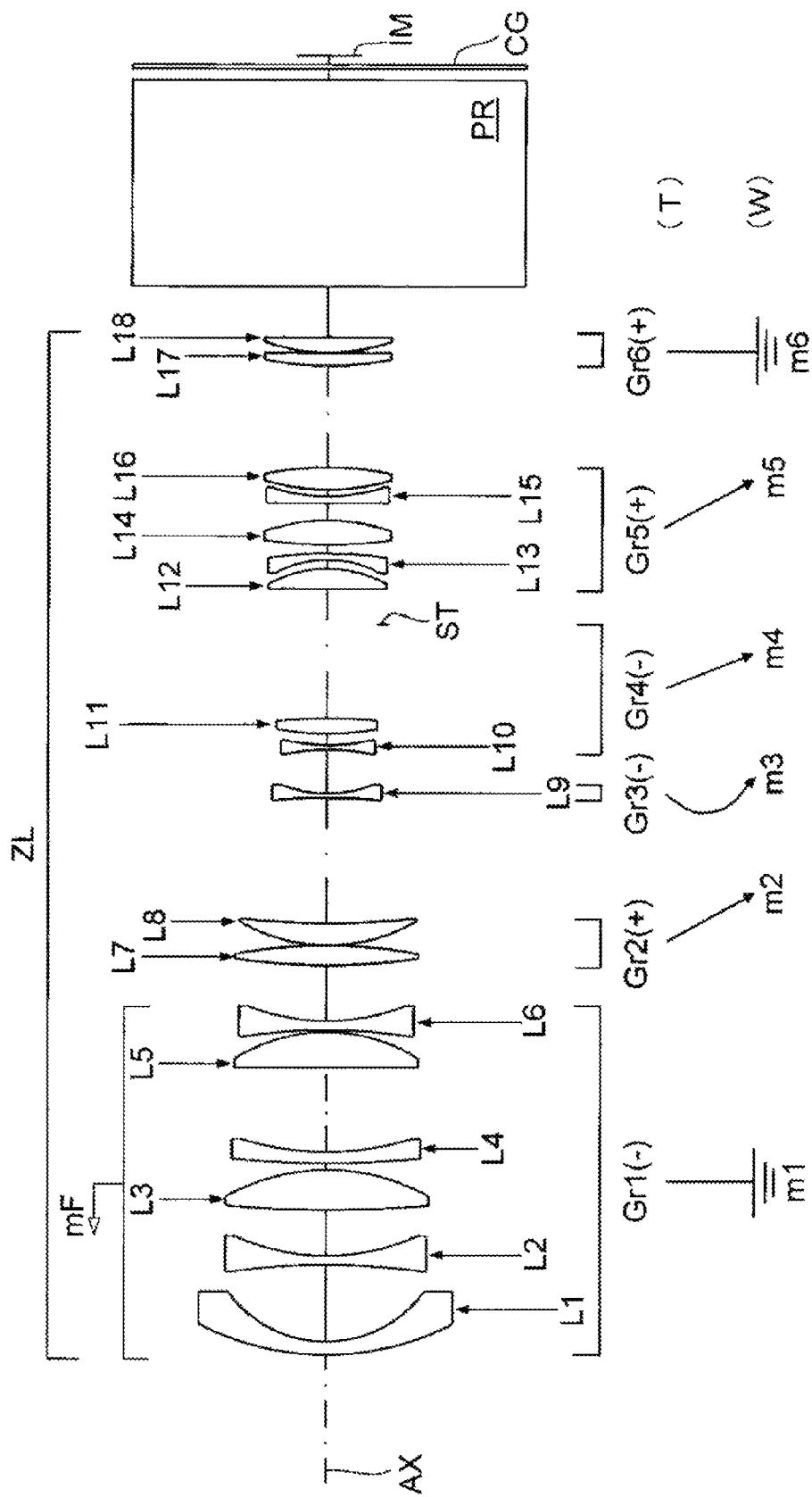
FIG. 4 is a lens configuration diagram of a fourth embodiment (Example 4)
Figure 5:
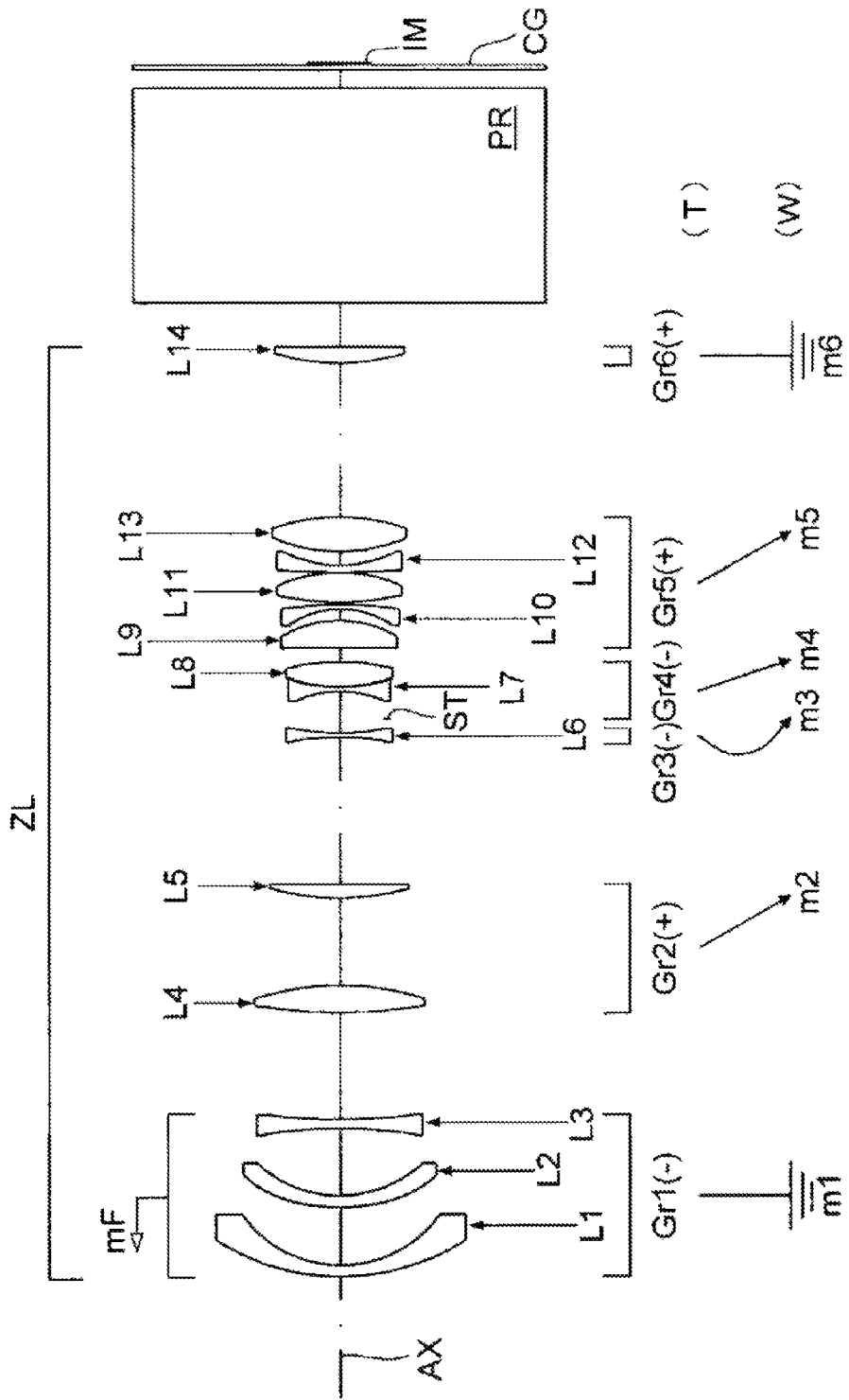
FIG. 5 is a lens configuration diagram of a fifth embodiment (Example 5)

Hereinafter, an embodiment of the present invention will be described with reference to the drawings. However, the scope of the invention is not limited to the illustrated examples.

A projection lens, a projector, and others according to embodiments of the present invention will be described below. According to an embodiment of the present invention, there is provided a projection lens with a magnifying function that is composed of a first lens group having negative refractive power, a second lens group having positive refractive power, a third lens group having negative refractive power, a fourth lens group having negative refractive power, a fifth lens group having positive refractive power, and a sixth lens group having positive refractive power, in sequence from the enlargement conjugate side. The projection lens performs magnification by changing the spacing between the lens groups. A magnifying optical system constituting the projection lens may be a focal-length variable lens system including zoom lenses or varifocal lenses. In the following description, the directions of the magnifying optical system will be expressed with the use of the terms "enlargement conjugate side" and "reduction conjugate side." The "enlargement conjugate side" refers to the direction in which an optical image is enlarged and projected onto a screen or the like, and the opposite direction is set at the "reduction conjugate side," that is, the direction in which an image display element (for example, a digital micromirror device) for displaying the original optical image is arranged.

In the foregoing projection lens, at the time of magnification from the telephoto end to the wide-angle end, the second, third, fourth, and fifth lens groups are moved, an aperture stop is arranged between the surface of the third lens group closest to the reduction conjugate side (that is, rearmost surface) and the surface of the fifth lens group closest to the enlargement conjugate side (that is, the foremost surface), and the following conditional expressions (1) and (2) are satisfied:

$$4.0 < bf/fw \quad (1)$$

$$0.462 < dx/f2 < 0.605 \quad (2)$$

where bf: Air-converted back focus from the rearmost lens surface to an image plane, fw: Focal length of the entire projection lens at the wide-angle end, dx: Amount of movement of the second lens group at the time of magnification from the telephoto end to the wide-angle end, and f2: Focal length of the second lens group.

In the foregoing projection lens, a negative group-leading magnifying optical system is used to move the second to fifth lens groups at the time of magnification while assuring a wide viewing angle and a long back focus by using, thereby to suppress fluctuations in aberrations at the time of magnification. In the case of forming a three-plate projector, its back focus needs to satisfy the value set in the conditional expression (1). To keep favorably the telecentricity of the entire magnifying optical system, the aperture stop is arranged between the rearmost surface of the third lens group and the foremost surface of the fifth lens group. In addition, the amount of movement and the refractive power of the second lens group in charge of the main magnifying action are set as appropriate to satisfy the conditional expression (2), thereby realizing a high magnification ratio. When the upper limit in the conditional expression (2) is exceeded, fluctuations in aberrations at the time of magnification (in particular, magnification chromatic aberration) become large due to the movement of the second lens group, and the correction of the fluctuations in aberrations is made difficult by the other moving groups. In contrast, when the lower limit in the conditional expression (2) is underrun, the effect of magnification by the second lens group becomes lower, and the refractive power of the fifth lens group becomes larger to make more contribution to the magnification. When the refractive power of the fifth lens group becomes larger, the amount of correction of magnification chromatic aberration by the fifth lens group becomes excessive.

According to the characteristic configuration of the projection lens described above, the movement of the second lens group and the position of the aperture stop at the time of magnification are set appropriately. This makes it possible to provide the projection lens with high aberration performance and a high magnification ratio corresponding to high-definition image display elements, and achieves size reduction. Using the projection lens in a projector would contribute to providing the projector with high performance, high capability, compact size, and the like. Conditions for obtaining the foregoing effects in a balanced manner, achieving further higher optical performance, and realizing a smaller size will be described below.

The following conditional expression (3) is desirably satisfied:

$$1.000<\phi34min/\phi34max<1.160 \tag{3}$$

where $\phi34min$: Minimum value of synthetic refractive power of the third lens group and the fourth lens group in the entire magnification range, and $\phi34max$: Maximum value of synthetic refractive power of the third lens group and the fourth lens group in the entire magnification range.

In the magnifying optical system, fluctuations in axial chromatic aberration become larger with increase in magnification ratio. When the upper limit in the conditional expression (3) is exceeded, the axial chromatic aberration cannot be completely corrected with larger fluctuations in back focus. By reducing fluctuations in the synthetic refractive power of the third and fourth lens groups arranged in the vicinity of the aperture stop to satisfy the conditional expression (3), the fluctuations in the axial chromatic aberration can also be reduced. When the fluctuations in the synthetic refractive power of the third and fourth lens groups at time of magnification are small, the fluctuations in back focus caused by the third and fourth lens groups can also be decreased.

At the time of magnification from the telephoto end to the wide-angle end, the third lens group desirably moves to the enlargement conjugate side and then makes a U turn to the reduction conjugate side. Specifically, at the time of magnification, the third lens group desirably moves in an arc trajectory convex to the enlargement conjugate side. The fluctuations in the axial chromatic aberration occurs in an under direction at a short-wavelength side (blue side) and in an over direction at a long-wavelength side (red side) at a middle focal length with respect to the telephoto end, and occurs in the over direction at the short-wavelength side and in the under direction at the long-wavelength side at the wide-angle end. That is, when the axial chromatic aberration also fluctuates in an arc at the time of magnification. Accordingly, moving the third lens group in an arc could reduce efficiently the fluctuations in axial chromatic aberration at the time of magnification. The effect of reducing the fluctuations in axial chromatic aberration would become further high when satisfying the conditional expression (3).

The third lens group desirably consists of lenses with negative refractive power. The third lens group plays the role of correcting the fluctuations in axial chromatic aberration. However, when the amount of movement of the third lens group is too large, the third lens group may interfere with the second lens group during the magnification. Accordingly, using only lenses with negative refractive power for the third lens group would increase the negative refractive power of the third lens group and reduce the movement of the third lens group.

At least one of the lenses with negative refractive power included in the third lens group and the fourth lens group desirably satisfies the following conditional expressions (4) and (5):

$$0.645<\theta g\_F+0.001682\times vd<0.695 \tag{4}$$

$$60<vd<100 \tag{5}$$

where $\theta g\_F$: Partial dispersion ratio of lens material $$\theta g\_F=(Ng-NF)/(NF-NC)$$

Ng: Refractive index relative to g line,
NF: Refractive index relative to F line,
NC: Refractive index relative to C line, and
vd: Abbe number of lens material.

In the third and fourth lens groups arranged in the vicinity of the aperture stop, the lenses with negative refractive power are made from glass material with anomalous dispersibility as prescribed in the conditional expressions (4) and (5) to reduce the axial chromatic aberration because the focus of light with a short wavelength moves toward the over side. In general, glass has the nature of being distributed in the vicinity of a straight line expressed as $\theta g\_F=0.645+0.001682\times vd$ on a plane where the horizontal axis indicates abbe number vd and the vertical axis indicates partial dispersion ratio $\theta g\_F$. Glass material with a partial dispersion ratio $\theta g\_F$ exceeding the straight line and an abbe number larger than the lower limit in the conditional expression (5) is called anomalous dispersion glass.

The anomalous dispersibility of the glass material for use in the lenses with negative refractive power included in the third and fourth lens groups is preferably larger. Specifically, the anomalous dispersibility further preferably satisfies the following conditional expression (4a). The conditional expression (4a) defines the further preferable conditional range within the conditional range defined by the conditional expression (4).

$$0.675<\theta g\_F+0.001682\times vd<0.695 \tag{4a}$$

The lenses exceeding the upper limits in the conditional expressions (4) and (5) are difficult to make from normal quartz glass, and need to be produced from fluorite glass or the like. However, fluorite glass is vulnerable to temperature changes and is not suitable for use in the vicinity of an aperture stop where the beam diameter is smaller and the temperature is likely to be higher. In addition, fluorite glass is poor in processibility and very expensive. Accordingly, using fluorite glass for the projection lens would unfavorably result in reduction of yield at the time of production with increase of manufacturing costs.

The fourth lens group desirably includes cemented lenses composed of a lens with negative refractive power and a lens with positive refractive power in sequence from the enlargement conjugate side. Using the cemented lenses in the vicinity of the aperture stop would reduce the axial chromatic aberration. In addition, a surface of the lens with positive refractive power and a surface of the lens with negative refractive power are cemented by each other's surfaces with the same curvature to cancel out the directions of generation of spherical aberrations. This is because the spherical aberrations are preferably corrected in the vicinity of the aperture stop under less influence of off-axis rays.

The first lens group desirably includes an aspherical lens. Off-axis rays pass through the first lens group at positions distant from the optical axis. When the first lens group consists of spherical lenses, the rays more distant from the optical axis have larger refraction angles and are prone to generate large distortions. In addition, to achieve a wider viewing angle, the negative refractive power of the first lens group needs to be increased and the distortions are likely to be larger in the under direction. To correct the distortions only by the spherical lenses, it is necessary to add a lens with positive refractive power to the first lens group to generate distortions in the over direction and cancel out all the distortions. The use of the aspherical lens would reduce changes in refraction angle resulting from the light passage areas. Accordingly, the distortions can be reduced. In addition, there is no need to add a lens with positive refractive power for use in correction of distortion by the spherical lenses alone, which achieves reduction in the number of lenses.

The material for the aspherical lens included in the first lens group is desirably a resin material. When the refractive power of the first lens group excluding the aspherical lens is sufficiently large for a desired viewing angle, the material for the aspherical lens may be a resin material with a relatively low refractive index. The aspherical lens is desirably arranged as closer to the enlargement conjugate side as possible. However, it is appropriate to arrange the aspherical lens at the position second closest to the enlargement conjugate side because the aspherical lens at the foremost side would likely to be scratched in particular when it is made from a resin material. In addition, the surface of a meniscus lens with negative refractive power convex to the enlargement conjugate side is desirably aspherical. In contrast, the aspherical surface of the lens at the reduction conjugate side where light flux is enlarged may interfere with the convergence of light flux at the time of image formation. The aspherical surface at the enlargement side is desirably shaped such that the curvature becomes larger from the axis toward the circumference.

Next, first to fifth embodiments will be taken to describe a specific optical configuration of the projection lens with magnifying function. FIGS. 1 to 5 illustrate lens configurations of a zoom lens ZL as first to fifth embodiments of the projection lens, which are optical cross-sectional views of lens layouts and the like at a telephoto end (T). In FIGS. 1 to 5, movement loci mk (k=1, 2, ... , 6) indicate schematic moving and fixed states of a k-th lens group Grk in zooming from the telephoto end (T) to a wide-angle end (W). In addition, an arrow mF in FIGS. 1 to 5 indicates the movement direction of a first lens group Gr1 in focusing where a projection distance changes from along distance to a short distance. However, the focusing method is not limited to this.

The zoom lens ZL in the first to fifth embodiments (see FIGS. 1 to 5) is a projector zoom lens composed of six lens groups including the first lens group Gr1 with negative refractive power, a second lens group Gr2 with positive refractive power, a third lens group Gr3 with negative refractive power, a fourth lens group Gr4 with negative refractive power, a fifth lens group Gr5 with positive refractive power, and a sixth lens group Gr6 with positive refractive power, in sequence from the enlargement conjugate side. The second lens group Gr2, the third lens group Gr3, the fourth lens group Gr4, and the fifth lens group Gr5 are moved along an optical axis AX to perform zooming. That is, in the first to fifth embodiments, the zoom lens ZL has the six groups with placement of negative, positive, negative, negative, positive, and positive refractive powers in sequence from the enlargement conjugate side, and the first lens group Gr1 and the six lens group Gr6 are fixed groups, and the second to fifth lens groups Gr2 to Gr5 are moving groups. Since the zoom position of the first lens group Gr1 is fixed, it is possible to suppress changes in the entire length of the optical system due to magnification, and simplify the magnification mechanism with decrease in moving components. In addition, the zoom positions of a prism PR positioned at the reduction conjugate side of the six lens group Gr6 (for example, a TIR (total internal reflection) prism, a color separation/synthesis prism, or the like) and a cover glass CG on an image display element are also fixed.

Figure 21:
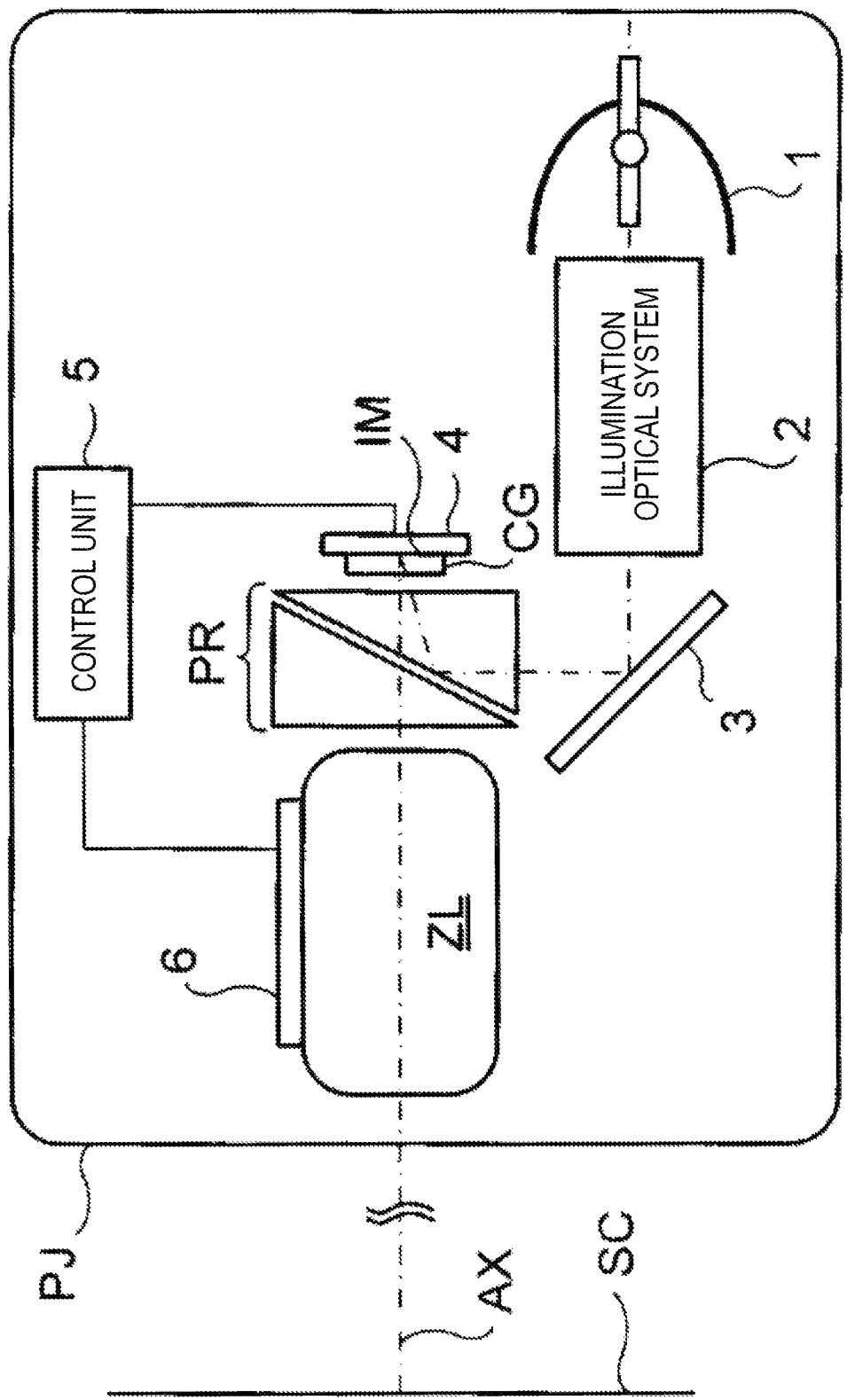
FIG. 21 is a schematic diagram of an embodiment of a projector.

Next, an embodiment of a projector to which the zoom lens ZL is applied as a projection lens will be described. FIG. 21 illustrates a schematic configuration example of a projector PJ. The projector PJ includes a light source 1, an illumination optical system 2, a reflection mirror 3, a prism PR, an image display element (image forming element) 4, a control unit 5, an actuator 6, and the zoom lens (projection lens) ZL. The control unit 5 takes charge of overall control of the projector PJ. The image display element 4 is an image modulation element that modulates light to generate an image (for example, a digital micromirror device), and has a cover glass CG on an image display surface IM where an image is displayed.

Light emitted from the light source 1 (for example, a white light source such as a xenon lamp or a laser light source) is guided to the image display element 4 by the illumination optical system 2, the reflection mirror 3, and the prism PR, and image light is formed by the image display element 4. The prism PR is composed of a TIR prism (or a color separation/synthesis prism or the like), for example, to separate illumination light and projection light. The image light formed by the image display element 4 is enlarged and projected by the zoom lens ZL onto a screen surface SC. That is, the image displayed on the image display element 4 is enlarged and projected by the zoom lens ZL onto the screen surface SC.

As described above, the projector PJ includes the image display element 4 that displays an image, the light source 1, the illumination optical system 2 that guides light from the light source 1 to the image display element 4, and the zoom lens ZL that enlarges and projects the image displayed on the image display element 4 onto the screen surface SC. However, the projector to which the zoom lens ZL as the projection lens is applicable is not limited to this. For example, using an image display element that displays an image by light emitted from its image display surface would eliminate the need for a separate illumination unit. In that case, the projector can be formed without the light source 1 or the illumination optical system 2.

The actuator 6 is connected to the lens groups moving for zooming and focusing in the zoom lens ZL to move the lens groups along the optical axis AX toward the enlargement conjugate side or the reduction conjugate side. The control unit 5 is connected to the actuator 6 to control movement of the moving groups. The lens groups may be moved manually without using the control unit 5 and the actuator 6.

EXAMPLES

Configuration examples and the like of the projection lens in which the present invention is carried out will be further specifically described with construction data and the like of examples. Examples 1 to 5 (EX1 to EX5) taken herein are numerical examples corresponding to the first to fifth embodiments, respectively. Lens configuration diagrams (FIGS. 1 to 5) representing Examples 1 to 5 illustrate lens cross-section shapes, lens layouts, and others in the corresponding to Examples 1 to 5, respectively.

The respective construction data in the examples includes, as surface data, surface number i, curvature radius CR (mm), axial inter-surface distance d (mm), refractive index nd relative to d line (wavelength of 587.56 nm), and abbe number νd relative to d line, in sequence from the leftmost column. In the surface data, Lj/Grk indicates the applicable j-th lens Lj and k-th lens group Grk, ST the aperture stop, and IM the image display surface.

The surfaces with surface number i plus symbol * are aspherical surfaces and their shapes are defined by the following equation (AS) using a local orthogonal coordinate system (x, y, z) with the surface vertex as an original point. The aspherical surface data includes an aspherical coefficient and others. In the respective aspherical surface data of the examples, the coefficients for items not described herein are 0, and $E{-}n = \times 10^{-n}$ is applied to all the data.

$$z = (c \cdot h^2)/[1 + \sqrt{\{1 + (1+K) \cdot c^2 \cdot h^2\}}] + \Sigma(At \cdot h^t) \quad \text{(AS)}$$

where h: Height vertical to z axis (optical axis AX) ($h^2 = x^2 + y^2$), z: Amount of sag at the height h along the optical axis AX (with respect to the surface vertex), c: Curvature at the surface vertex (inverse of curvature radius r), K: Conic constant, and At: t-th aspherical coefficient.

Various data include focal length (f, mm), zoom ratio, image height (Y', mm), half angle (ω,°), F number, back focus (BF, mm), entire lens length (mm), and synthetic refractive power φ34 of the third and fourth lens groups Gr3 and Gr4 in the entire system. The data varying with zooming is expressed with the values at zoom positions T (TELE), M (MIDDLE), and W (WIDE). For example, the inter-group distance is shown by variable inter-surface distance di (i: surface number, mm). For the back focus BF, the distance from the rearmost lens surface to a paraxial image plane IM is represented by an air-converted length. The entire lens length is determined by adding the back focus BF to the distance from the foremost surface of the zoom lens ZL (i=1) to the rearmost surface of the zoom lens ZL. The image height Y' is equivalent to half the diagonal length of the image display surface IM.

The zoom lens group data includes respective focal lengths (mm) of the lens groups and respective amounts of movements (mm) of the lens groups at the middle position (M) and the wide-angle end (W) with respect to the telephoto end (T). In addition, Table 1 shows respective values for the conditional expressions in the examples.

FIGS. 6 to 20 are aberration diagrams in Examples 1 to 5 (EX1 to EX5), respectively. FIGS. 6, 9, 12, 15, and 18 illustrate aberrations at the telephoto end (T), FIGS. 7, 10, 13, 16, and 19 illustrate aberrations at the middle position (M, medium focal length state), and FIGS. 8, 11, 14, 17, and 20 illustrate aberrations at the wide-angle end (W). In each of FIGS. 6 to 20, (A) shows spherical aberrations (mm), (B) astigmatisms (mm), (C) distortions (%), and (D) magnification chromatic aberrations (mm).

In the spherical aberration diagram (A), the vertical axis indicates the values of entrance height of a light beam into a pupil standardized by the maximum height (that is, relative pupil height), and the horizontal axis indicates the amounts of spherical aberration relative to light beams with wavelengths 460 nm, 546 nm, and 620 nm as the amounts of shift from the paraxial image plane in the direction of the optical axis AX (horizontal axis scale: −0.1 mm to 0.1 mm). In the spherical aberration diagram, the correspondences between the wavelengths and the kinds of line are as follows:

Spherical aberrations at a wavelength of 460 nm: Long broken line, and

Spherical aberrations at a wavelength of 546 nm: Solid line, and

Spherical aberrations at a wavelength of 620 nm: Short broken line.

In the astigmatism diagram (B), the vertical axis indicates paraxial image heights (mm), and the horizontal axis indicates sagittal (S) image planes and meridional (M) image planes at wavelengths of 460 nm, 546 nm, and 620 nm as the amounts of shift from the paraxial image plane in the direction of the optical axis AX (horizontal axis scale: −0.1 mm to 0.1 mm). In the astigmatism diagram, the correspondences between the wavelengths and the kinds of line are as follows:

S image plane at a wavelength of 460 nm: One-dot broken line,

M image plane at a wavelength of 460 nm: Dotted line,

S image plane at a wavelength of 546 nm: Long broken line,

M image plane at a wavelength of 546 nm: Solid line,

S image plane at a wavelength of 620 nm: Two-dot broken line, and

M image plane at a wavelength of 620 nm: Short broken line.

In the distortion diagram (C), the vertical axis indicates paraxial image heights (mm), and the horizontal axis indicates distortions relative to a light beam with a wavelength of 546 nm (horizontal axis scale: −1.5% to 1.5%).

In the magnification chromatic aberration diagram (D), the vertical axis indicates paraxial image heights (mm), and the horizontal axis indicates magnification chromatic aberrations (Blue-Green) equivalent to differences between a light beam with a wavelength of 460 nm and a light beam with a wavelength of 546 nm, and magnification chromatic aberrations (Red-Green) equivalent to differences between a light beam with a wavelength of 620 nm and a light beam with a wavelength of 546 nm (horizontal axis scale: −0.005 mm to 0.005 mm). In the magnification chromatic aberration diagram, the correspondences between the wavelengths and the kinds of line are as follows:

Magnification chromatic aberrations (Blue-Green): Solid line and

Magnification chromatic aberrations (Red-Green): Broken line.

In Examples 1 to 5, the projection distance is 2 to 5.2 m, the image cycle is 17 mm (Y'=8.5), and the magnification ratio is two times. In Examples 1 to 5, the projection lens is composed of six negative, positive, negative, negative, positive, and positive lens groups. The sixth lens group Gr6 is fixed relative to the reduction conjugate-side image plane IM. The optical members arranged closer to the reduction conjugate-side lens back than the sixth lens group Gr6 are the prism PR of flat planes at both sides and the cover glass CG on the image display element 4, and they are configured as follows:

Prism PR: d=54.00 mm, nd=1.52, and νd=64.20;

Air space: d=5.00 mm;

Cover glass CG: d=1.05 mm, nd=1.49, and νd=70.44;

Air space: d=0.70 mm; and

Image display element 4.

In Examples 1 to 5, the optical system is almost telecentric with an exit pupil distance of 1000 mm or more. The first lens group Gr1 is fixed at the time of magnification (arrow m1 in FIGS. 1 to 5), and is movable only for focusing with a change in projection distance. Specifically, the focusing on the screen surface SC from the long-distance side to the short-distance side is performed by moving the first lens group Gr1 toward the enlargement conjugate side (arrow mF in FIGS. 1 to 5). At the time of magnification from the telephoto end (T) to the wide-angle end (W), the second lens group Gr2, the fourth lens group Gr4, and the fifth lens group Gr5 move from the enlargement conjugate side to the reduction conjugate side, and the third lens group Gr3 moves in an arc trajectory convex to the enlargement conjugate side (when the movement with is started at the time of magnification) (arrows m2 to m5 in FIGS. 1 to 5).

Example 1 is composed of six negative, positive, negative, negative, positive, and positive lens groups in which the first lens group Gr1 includes three negative, negative, and negative lenses, the second lens group Gr2 includes two positive and positive lenses, the third lens group Gr3 includes one negative lens, the fourth lens group Gr4 includes two negative and positive lenses, the fifth lens group Gr5 includes five positive, negative, positive, negative, and positive lenses, and the sixth lens group Gr6 includes one positive lens, which brings the total to 14 (first lens L1 to 14th lens L14). The first to 29th surfaces belong to lens units of the zoom lens ZL, and the 30th and subsequent surfaces belong to the prism PR and the cover glass CG of the display element 4. The 13th surface falls at the aperture stop that is positioned closest to the enlargement conjugate side of the fourth lens group Gr4, and moves integrally as a portion of the fourth lens group Gr4 at the time of magnification (arrow m4 in FIG. 1). The two lenses L7 and L8 of the fourth lens group Gr4 are cemented lenses in which the 15th surface and the 16th surface are stuck to each other. The second lens L2 of the first lens group Gr1 has aspherical surfaces (third and fourth surfaces) at both sides and is made from an acrylic resin.

The air-converted length of the back focus is 53.01 mm and bf/fw=4.174, which satisfies the conditional expression (1). The focal length of the second lens group Gr2 is 54.96 mm, the amount of movement of the second lens group Gr2 from the telephoto end T to the wide-angle end W is 32.34 mm, and dx/f2=0.588, which satisfies the conditional expression (2). The synthetic refractive power of the third lens group Gr3 and the fourth lens group Gr4 takes on the maximum value of −0.01416 and the minimum value of −0.01457 in the entire magnification range, and φ34min/φ34max=1.0284, which satisfies the conditional expression (3). The negative lenses included in the third lens group Gr3 and the fourth lens group Gr4 are the sixth and seventh lenses L6 and L7, and θg_F and νd take on the following values, which each satisfy the conditional expressions (4) and (5):

$$L6 \ldots \theta g\_F + 0.001682 \times \nu d = 0.676, \nu d = 81.61, \theta g\_F = 0.0375$$

$$L7 \ldots \theta g\_F + 0.001682 \times \nu d = 0.647, \nu d = 63.39, \theta g\_F = 0.0060.$$

Example 2 is composed of six negative, positive, negative, negative, positive, and positive lens groups in which the first lens group Gr1 includes three negative, negative, and negative lenses, the second lens group Gr2 includes two positive and positive lenses, the third lens group Gr3 includes one negative lens, the fourth lens group Gr4 includes two negative and positive lenses, the fifth lens group Gr5 includes five positive, negative, positive, negative, and positive lenses, and the sixth lens group Gr6 includes one positive lens, which brings the total to 14 (first lens L1 to 14th lens L14). The first to 29th surfaces belong to lens units of the zoom lens ZL, and the 30th and subsequent surfaces belong to the prism PR and the cover glass CG of the display element 4. The 13th surface falls at the aperture stop that is positioned closest to the enlargement conjugate side of the fourth lens group Gr4, and moves integrally as a portion of the fourth lens group Gr4 at the time of magnification (arrow m4 in FIG. 2). The two lenses L7 and L8 of the fourth lens group Gr4 are cemented lenses in which the 15th surface and the 16th surface are stuck to each other. The second lens L2 of the first lens group Gr1 has an aspherical surface (fourth surface) at the reduction side and is made from a cyclo-olefin polymer resin.

The air-converted length of the back focus is 53.01 mm and bf/fw=4.167, which satisfies the conditional expression (1). The focal length of the second lens group Gr2 is 59.04 mm, the amount of movement of the second lens group Gr2 from the telephoto end T to the wide-angle end W is 27.36 mm, and dx/f2=0.463, which satisfies the conditional expression (2). The synthetic refractive power of the third lens group Gr3 and the fourth lens group Gr4 takes on the maximum value of −0.01593 and the minimum value of −0.01772 in the entire magnification range, and φ34min/φ34max=1.1124, which satisfies the conditional expression (3). The negative lenses included in the third lens group Gr3 and the fourth lens group Gr4 are the sixth and seventh lenses L6 and L7, and θg_F and νd take on the following values, which each satisfy the conditional expressions (4) and (5):

$$L6 \ldots \theta g\_F + 0.001682 \times \nu d = 0.676, \nu d = 81.61, \theta g\_F = 0.0375$$

$$L7 \ldots \theta g\_F + 0.001682 \times \nu d = 0.647, \nu d = 63.39, \theta g\_F = 0.0060.$$

Example 3 is composed of six negative, positive, negative, negative, positive, and positive lens groups in which the first lens group Gr1 includes two negative and negative lenses, the second lens group Gr2 includes two positive and positive lenses, the third lens group Gr3 includes one negative lens, the fourth lens group Gr4 includes two negative and positive lenses, the fifth lens group Gr5 includes five positive, negative, positive, negative, and positive lenses, and the sixth lens group Gr6 includes one positive lens, which brings the total to 13 (first lens L1 to 13th lens L13). The first to 27th surfaces belong to lens units of the zoom lens ZL, and the 28th and subsequent surfaces belong to the prism PR and the cover glass CG of the display element 4. The 11th surface falls at the aperture stop that is positioned closest to the enlargement conjugate side of the fourth lens group Gr4, and moves integrally as a portion of the fourth lens group Gr4 at the time of magnification (arrow m4 in FIG. 3). The two lenses L6 and L7 of the fourth lens group Gr4 are cemented lenses in which the 13th surface and the 14th surface are stuck to each other. The second lens L2 of the first lens group Gr1 has aspherical surfaces (third and fourth surfaces) at both sides and is a glass mold-type aspherical lens.

The air-converted length of the back focus is 53.01 mm and bf/fw=4.158, which satisfies the conditional expression (1). The focal length of the second lens group Gr2 is 53.98 mm, the amount of movement of the second lens group Gr2 from the telephoto end T to the wide-angle end W is 31.11 mm, and dx/f2=0.576, which satisfies the conditional expression (2). The synthetic refractive power of the third lens group Gr3 and the fourth lens group Gr4 takes on the maximum value of −0.01224 and the minimum value of −0.01236 in the entire magnification range, and φ34min/φ34max=1.0094, which satisfies the conditional expression (3). The negative lenses included in the third lens group Gr3 and the fourth lens group Gr4 are the fifth and sixth lenses L5 and L6, and θg_F and νd take on the following values, which each satisfy the conditional expressions (4) and (5):

L6 ... θg_F+0.001682×νd=0.676, νd=81.61, θg_F=0.0375

L7 ... θg_F+0.001682×νd=0.647, νd=63.39, θg_F=0.0060.

Example 4 is composed of six negative, positive, negative, negative, positive, and positive lens groups in which the first lens group Gr1 includes six negative, negative, positive, negative, positive, and negative lenses, the second lens group Gr2 includes two positive and positive lenses, the third lens group Gr3 includes one negative lens, the fourth lens group Gr4 includes two negative and positive lenses, the fifth lens group Gr5 includes five positive, negative, positive, negative, and positive lenses, and the sixth lens group Gr6 includes two positive and positive lens, which brings the total to 18 (first lens L1 to 18th lens L18). The first to 37th surfaces belong to lens units of the zoom lens ZL, and the 38th and subsequent surfaces belong to the prism PR and the cover glass CG of the display element 4. The 23th surface falls at the aperture stop that is positioned closest to the reduction conjugate side of the fourth lens group Gr4, and moves integrally as a portion of the fourth lens group Gr4 at the time of magnification (arrow m4 in FIG. 4).

The air-converted length of the back focus is 55.01 mm and bf/fw=4.343, which satisfies the conditional expression (1). The focal length of the second lens group Gr2 is 55.05 mm, the amount of movement of the second lens group Gr2 from the telephoto end T to the wide-angle end W is 33.24 mm, and dx/f2=0.604, which satisfies the conditional expression (2). The synthetic refractive power of the third lens group Gr3 and the fourth lens group Gr4 takes on the maximum value of −0.01471 and the minimum value of −0.01474 in the entire magnification range, and φ34min/φ34max=1.0017, which satisfies the conditional expression (3). The negative lenses included in the third lens group Gr3 and the fourth lens group Gr4 are the ninth and tenth lenses L9 and L10, and θg_F and νd take on the following values, which each satisfy the conditional expressions (4a) and (5):

L9 ... θg_F+0.001682×νd=0.693, νd=95.10, θg_F=0.0564

L10 ... θg_F+0.001682×νd=0.693, νd=95.10, θg_F=0.0564

Example 5 is composed of six negative, positive, negative, negative, positive, and positive lens groups in which the first lens group Gr1 includes three negative, negative, and negative lenses, the second lens group Gr2 includes two positive and positive lenses, the third lens group Gr3 includes one negative lens, the fourth lens group Gr4 includes two negative and positive lenses, the fifth lens group Gr5 includes five positive, negative, positive, negative, and positive lenses, and the sixth lens group Gr6 includes one positive lens, which brings the total to 14 (first lens L1 to 14th lens L14). The first to 29th surfaces belong to lens units of the zoom lens ZL, and the 30th and subsequent surfaces belong to the prism PR and the cover glass CG of the display element 4. The 13th surface falls at the aperture stop that is positioned closest to the enlargement conjugate side of the fourth lens group Gr4, and moves integrally as a portion of the fourth lens group Gr4 at the time of magnification (arrow m4 in FIG. 5). The two lenses L7 and L8 of the fourth lens group Gr4 are cemented lenses in which the 15th surface and the 16th surface are stuck to each other. The second lens L2 of the first lens group Gr1 has an aspherical surface (third surface) at the aspherical side and is made from a cyclo-olefin polymer resin.

The air-converted length of the back focus is 53.01 mm and bf/fw=4.168, which satisfies the conditional expression (1). The focal length of the second lens group Gr2 is 58.77 mm, the amount of movement of the second lens group Gr2 from the telephoto end T to the wide-angle end W is 29.17 mm, and dx/f2=0.496, which satisfies the conditional expression (2). The synthetic refractive power of the third lens group Gr3 and the fourth lens group Gr4 takes on the maximum value of −0.01578 and the minimum value of −0.01723 in the entire magnification range, and φ34min/φ34max=1.0919, which satisfies the conditional expression (3). The negative lenses included in the third lens group Gr3 and the fourth lens group Gr4 are the sixth and seventh lenses L6 and L7, and θg_F and νd take on the following values, which each satisfy the conditional expressions (4) and (5):

L6 ... θg_F+0.001682×νd=0.676, νd=81.61, θg_F=0.0375

L7 ... θg_F+0.001682×νd=0.647, νd=63.39, θg_F=0.0060.

In the case of using the zoom lens ZL in the examples as a projection lens for the projector (for example, a liquid crystal projector) PJ, in general, the screen surface (projected surface) SC constitutes an image plane and the image display surface IM (for example, a liquid crystal panel surface) constitutes an object plane. In the examples, the optical system is set as a reduction system for the convenience of optical design, the screen surface SC (FIG. 21) is regarded as an object surface and optical performance is evaluated on the image display surface (reduction conjugate-side image plane) IM. In addition, the zoom lens ZL in the examples is preferably applicable not only as a projection lens for projectors but also as an imaging lens for imaging devices (for example, video cameras and digital cameras).

Example 1

| | Unit: mm | | | |
|---|---|---|---|---|
| | Surface data | | | |
| i | CR | d | nd | νd |
| 1 | 49.36 | 3.08 | 1.76 | 40.10(L1/Gr1) |
| 2 | 29.24 | 9.37 | | |

-continued

| | | Unit: mm | | |
|---|---|---|---|---|
| 3* | 53.21 | 2.79 | 1.49 | 57.49(L2/Gr1) |
| 4* | 28.86 | 16.49 | | |
| 5 | −171.33 | 2.32 | 1.83 | 37.34(L3/Gr1) |
| 6 | 105.14 | Variable | | |
| 7 | 166.77 | 6.67 | 1.52 | 64.20(L4/Gr2) |
| 8 | −63.72 | 18.45 | | |
| 9 | 63.22 | 3.27 | 1.79 | 43.93(L5/Gr2) |
| 10 | 217.08 | Variable | | |
| 11 | −78.66 | 1.42 | 1.50 | 81.61(L6/Gr3) |
| 12 | 68.64 | Variable | | |
| 13 | ∞ | 10.07 | | (ST/Gr4) |
| 14 | −33.74 | 1.42 | 1.62 | 63.39(L7/Gr4) |
| 15 | 43.28 | 0.01 | 1.55 | 47.00 |
| 16 | 43.28 | 6.73 | 1.69 | 31.16(L8/Gr4) |
| 17 | −48.65 | Variable | | |
| 18 | 581.31 | 5.89 | 1.50 | 81.61(L9/Gr5) |
| 19 | −31.42 | 2.30 | | |
| 20 | −27.37 | 1.57 | 1.91 | 35.25(L10/Gr5) |
| 21 | −422.47 | 0.35 | | |
| 22 | 105.15 | 7.03 | 1.50 | 81.61(L11/Gr5) |
| 23 | −35.23 | 0.20 | | |
| 24 | 100.45 | 1.75 | 1.95 | 32.32(L12/Gr5) |
| 25 | 38.80 | 2.65 | | |
| 26 | 45.12 | 7.66 | 1.50 | 81.61(L13/Gr5) |
| 27 | −60.38 | Variable | | |
| 28 | 53.46 | 4.48 | 1.50 | 81.61(L14/Gr6) |
| 29 | −744.57 | 11.00 | | |
| 30 | ∞ | 54.00 | 1.52 | 64.20(PR) |
| 31 | ∞ | 5.00 | | |
| 32 | ∞ | 1.05 | 1.49 | 70.44(CG) |
| 33 | ∞ | 0.70 | | |
| 34 (IM) | | | | |

| | | Aspheric surface data | | |
|---|---|---|---|---|
| i | K | A4 | A6 | A8 | A10 |
| 3 | 0.0000E+00 | 1.4981E−05 | −1.3607E−08 | −1.2727E−11 | 3.3770E−14 |
| 4 | 0.0000E+00 | 1.1162E−05 | −5.5526E−09 | −7.5972E−11 | 1.1372E−13 |

| | Various data | | |
|---|---|---|---|
| | TELE | MIDDLE | WIDE |
| Focal length | 25.41 | 18.00 | 12.70 |
| Zoom ratio | 2.00 | | |
| Image height | 8.50 | | |
| Half angle ω | 18.49 | 25.28 | 33.79 |
| F number | 2.53 | 2.25 | 2.00 |
| BF | 53.01 | | |
| Entire lens length | 230.00 | | |
| φ34 | −0.01416 | −0.01456 | −0.01457 |
| Inter-group space | | | |
| d6 | 27.25 | 38.17 | 59.60 |
| d10 | 32.10 | 17.90 | 4.78 |
| d12 | 6.54 | 30.57 | 31.06 |
| d17 | 0.52 | 0.81 | 9.39 |
| d27 | 39.42 | 18.37 | 1.00 |

| Zoom lens group data | | | |
|---|---|---|---|
| | Amount of movement of group (with respect to TELE) | | |
| | MIDDLE | WIDE | Focal length |
| Gr1 | 0.00 | 0.00 | −27.60 |
| Gr2 | 10.92 | 32.34 | 54.96 |
| Gr3 | −3.28 | 5.02 | −73.30 |
| Gr4 | 20.75 | 29.54 | −829.88 |
| Gr5 | 21.05 | 38.42 | 96.99 |
| Gr6 | 0.00 | 0.00 | 100.25 |

Example 2

| Unit: mm | | | | |
|---|---|---|---|---|
| Surface data | | | | |
| i | CR | d | nd | vd |
| 1 | 53.24 | 3.29 | 1.76 | 40.10(L1/Gr1) |
| 2 | 31.24 | 15.87 | | |
| 3 | 66.65 | 2.89 | 1.53 | 56.38(L2/Gr1) |
| 4* | 27.93 | 15.37 | | |
| 5 | −124.28 | 2.51 | 1.67 | 47.20(L3/Gr1) |
| 6 | 186.38 | Variable | | |
| 7 | 147.91 | 7.55 | 1.52 | 64.20(L4/Gr2) |
| 8 | −69.69 | 24.71 | | |
| 9 | 72.15 | 3.23 | 1.79 | 43.93(L5/Gr2) |
| 10 | 314.09 | Variable | | |
| 11 | −85.43 | 1.58 | 1.50 | 81.61(L6/Gr3) |
| 12 | 78.99 | Variable | | |
| 13 | ∞ | 6.31 | | (ST/Gr4) |
| 14 | −33.30 | 1.35 | 1.62 | 63.39(L7/Gr4) |
| 15 | 36.18 | 0.01 | 1.55 | 47.00 |
| 16 | 36.18 | 6.60 | 1.67 | 32.17(L8/Gr4) |
| 17 | −56.25 | Variable | | |
| 18 | −817.81 | 6.15 | 1.50 | 81.61(L9/Gr5) |
| 19 | −27.32 | 2.71 | | |
| 20 | −23.14 | 1.54 | 1.83 | 37.34(L10/Gr5) |
| 21 | −86.21 | 0.75 | | |
| 22 | 69.75 | 7.48 | 1.50 | 81.61(L11/Gr5) |
| 23 | −37.33 | 0.25 | | |
| 24 | 258.69 | 1.73 | 1.83 | 37.34(L12/Gr5) |
| 25 | 33.44 | 3.23 | | |
| 26 | 42.06 | 8.80 | 1.50 | 81.61(L13/Gr5) |
| 27 | −49.47 | Variable | | |
| 28 | 53.09 | 4.28 | 1.50 | 81.61(L14/Gr6) |
| 29 | ∞ | 11.00 | | |
| 30 | ∞ | 54.00 | 1.52 | 64.20(PR) |
| 31 | ∞ | 5.00 | | |
| 32 | ∞ | 1.05 | 1.49 | 70.44(CG) |
| 33 | ∞ | 0.70 | | |
| 34 (IM) | | | | |

| Aspheric surface data | | | | | |
|---|---|---|---|---|---|
| i | K | A4 | A6 | A8 | A10 |
| 4 | 0.0000E+00 | −5.4843E−06 | −8.1259E−09 | 5.8833E−12 | −1.6062E−14 |

| Various data | | | |
|---|---|---|---|
| | TELE | MIDDLE | WIDE |
| Focal length | 25.45 | 17.97 | 12.72 |
| Zoom ratio | 2.00 | | |
| Image height | 8.50 | | |
| Half angle ω | 18.47 | 25.32 | 33.75 |
| F number | 2.56 | 2.30 | 2.00 |
| BF | 53.01 | | |
| Entire lens length | 235.00 | | |
| φ34 | −0.01593 | −0.01727 | −0.01772 |
| Inter-group space | | | |
| d6 | 18.78 | 27.28 | 46.14 |
| d10 | 37.40 | 20.98 | 4.84 |
| d12 | 3.17 | 30.95 | 40.12 |
| d17 | 0.78 | 1.25 | 7.57 |
| d27 | 39.54 | 19.22 | 1.00 |

| Zoom lens group data | | | |
|---|---|---|---|
| Amount of movement of group (with respect to TELE) | | | |
| | MIDDLE | WIDE | Focal length |
| Gr1 | 0.00 | 0.00 | −28.43 |
| Gr2 | 8.50 | 27.36 | 59.04 |
| Gr3 | −7.92 | −5.21 | −73.30 |
| Gr4 | 19.85 | 31.74 | −251.39 |

-continued

| | Unit: mm | | |
|---|---|---|---|
| Gr5 | 20.32 | 38.54 | 76.79 |
| Gr6 | 0.00 | 0.00 | 106.51 |

Example 3

| | Unit: mm | | | |
|---|---|---|---|---|
| | Surface data | | | |
| i | CR | d | nd | νd |
| 1 | 57.02 | 2.75 | 1.74 | 44.90(L1/Gr1) |
| 2 | 25.43 | 14.75 | | |
| 3* | 110.14 | 3.00 | 1.90 | 31.00(L2/Gr1) |
| 4* | 37.44 | Variable | | |
| 5 | 386.77 | 6.20 | 1.52 | 64.20(L3/Gr2) |
| 6 | −60.21 | 10.10 | | |
| 7 | 59.05 | 3.79 | 1.79 | 43.93(L4/Gr2) |
| 8 | 199.75 | Variable | | |
| 9 | −97.90 | 1.54 | 1.50 | 81.61(L5/Gr3) |
| 10 | 65.30 | Variable | | |
| 11 | ∞ | 9.06 | | (ST/Gr4) |
| 12 | −33.23 | 1.43 | 1.62 | 63.39(L6/Gr4) |
| 13 | 42.28 | 0.01 | 1.55 | 47.00 |
| 14 | 42.28 | 7.04 | 1.69 | 31.16(L7/Gr4) |
| 15 | −45.66 | Variable | | |
| 16 | −966.87 | 5.34 | 1.50 | 81.61(L8/Gr5) |
| 17 | −32.59 | 2.54 | | |
| 18 | −27.07 | 1.57 | 1.91 | 35.25(L9/Gr5) |
| 19 | −147.08 | 0.20 | | |
| 20 | 77.82 | 7.01 | 1.50 | 81.61(L10/Gr5) |
| 21 | −38.82 | 0.21 | | |
| 22 | 159.02 | 1.72 | 1.95 | 32.32(L11/Gr5) |
| 23 | 37.33 | 2.87 | | |
| 24 | 45.62 | 8.06 | 1.50 | 81.61(L12/Gr5) |
| 25 | −51.42 | Variable | | |
| 26 | 52.54 | 4.62 | 1.50 | 81.61(L13/Gr6) |
| 27 | −535.93 | 11.00 | | |
| 28 | ∞ | 54.00 | 1.52 | 64.20(PR) |
| 29 | ∞ | 5.00 | | |
| 30 | ∞ | 1.05 | 1.49 | 70.44(CG) |
| 31 | ∞ | 0.70 | | |
| 32 (IM) | | | | |

| | Aspheric surface data | | | |
|---|---|---|---|---|
| i | K | A4 | A6 | A8 | A10 |
| 3 | 0.0000E+00 | 7.7061E−06 | −2.1062E−08 | 2.1539E−11 | −4.4771E−15 |
| 4 | 0.0000E+00 | 2.8627E−06 | −2.6498E−08 | 1.8132E−11 | 1.6275E−15 |

| | Various data | | |
|---|---|---|---|
| | TELE | MIDDLE | WIDE |
| Focal length | 25.54 | 18.04 | 12.75 |
| Zoom ratio | 2.00 | | |
| Image height | 8.50 | | |
| Half angle ω | 18.41 | 25.23 | 33.70 |
| F number | 2.47 | 2.21 | 2.00 |
| BF | 53.01 | | |
| Entire lens length | 220.00 | | |
| φ34 | −0.01224 | −0.01236 | −0.01236 |
| Inter-group space | | | |
| d4 | 22.23 | 32.96 | 53.35 |
| d8 | 34.98 | 19.31 | 4.80 |
| d10 | 12.99 | 37.28 | 36.78 |
| d15 | 0.20 | 1.49 | 11.65 |
| d25 | 37.16 | 16.53 | 1.00 |

-continued

Unit: mm

Zoom lens group data

| | Amount of movement of group (with respect to TELE) | | |
|---|---|---|---|
| | MIDDLE | WIDE | Focal length |
| Gr1 | 0.00 | 0.00 | −28.31 |
| Gr2 | 10.72 | 31.11 | 53.98 |
| Gr3 | −4.95 | 0.93 | −78.34 |
| Gr4 | 19.34 | 24.72 | −2690.72 |
| Gr5 | 20.63 | 36.16 | 108.62 |
| Gr6 | 0.00 | 0.00 | 96.24 |

Example 4

Unit: mm

Surface data

| i | CR | d | nd | νd |
|---|---|---|---|---|
| 1 | 70.43 | 3.99 | 1.70 | 41.15(L1/Gr1) |
| 2 | 32.26 | 19.91 | | |
| 3 | −191.60 | 2.75 | 1.60 | 60.69(L2/Gr1) |
| 4 | 59.03 | 12.11 | | |
| 5 | 483.68 | 10.13 | 1.60 | 38.01(L3/Gr1) |
| 6 | −57.44 | 1.91 | | |
| 7 | 230.96 | 2.96 | 1.78 | 25.72(L4/Gr1) |
| 8 | 74.26 | 21.69 | | |
| 9 | 650.26 | 9.82 | 1.52 | 64.20(L5/Gr1) |
| 10 | −45.12 | 0.20 | | |
| 11 | −147.97 | 2.62 | 1.70 | 41.15(L6/Gr1) |
| 12 | 63.90 | Variable | | |
| 13 | 163.92 | 5.36 | 1.66 | 50.85(L7/Gr2) |
| 14 | −144.67 | 0.20 | | |
| 15 | 48.19 | 6.00 | 1.59 | 61.25(L8/Gr2) |
| 16 | 216.92 | Variable | | |
| 17 | −201.62 | 1.46 | 1.44 | 95.10(L9/Gr3) |
| 18 | 34.82 | Variable | | |
| 19 | −47.12 | 1.23 | 1.44 | 95.10(L10/Gr4) |
| 20 | 79.73 | 2.80 | | |
| 21 | 69.19 | 3.78 | 1.74 | 27.76(L11/Gr4) |
| 22 | −270.14 | 25.18 | | |
| 23 | ∞ | Variable | | (ST/Gr4) |
| 24 | −217.77 | 4.88 | 1.50 | 81.61(L12/Gr5) |
| 25 | −34.87 | 2.71 | | |
| 26 | −30.25 | 1.55 | 1.81 | 40.73(L13/Gr5) |
| 27 | −109.74 | 2.01 | | |
| 28 | 101.77 | 6.65 | 1.50 | 81.61(L14/Gr5) |
| 29 | −47.80 | 4.51 | | |
| 30 | −1573.23 | 1.64 | 1.83 | 37.34(L15/Gr5) |
| 31 | 50.32 | 2.03 | | |
| 32 | 60.54 | 5.93 | 1.50 | 81.61(L16/Gr5) |
| 33 | −79.72 | Variable | | |
| 34 | 104.43 | 2.99 | 1.50 | 81.61(L17/Gr6) |
| 35 | −6531.44 | 0.40 | | |
| 36 | 58.33 | 4.11 | 1.50 | 81.61(L18/Gr6) |
| 37 | ∞ | 13.00 | | |
| 38 | ∞ | 54.00 | 1.52 | 64.20(PR) |
| 39 | ∞ | 5.00 | | |
| 40 | ∞ | 1.05 | 1.49 | 70.44(CG) |
| 41 | ∞ | 0.70 | | |
| 42 (IM) | | | | |

Various data

| | TELE | MIDDLE | WIDE |
|---|---|---|---|
| Focal length | 25.35 | 17.92 | 12.67 |
| Zoom ratio | 2.00 | | |
| Image height | 8.50 | | |
| Half angle ω | 18.54 | 25.38 | 33.87 |
| F number | 2.29 | 2.16 | 2.00 |
| BF | 55.01 | | |
| Entire lens length | 268.00 | | |
| φ34 | −0.01471 | −0.01474 | −0.01473 |
| Inter-group space | | | |
| d13 | 12.77 | 26.29 | 46.03 |
| d16 | 32.61 | 15.05 | 3.08 |
| d18 | 11.57 | 14.55 | 14.10 |
| d23 | 7.09 | 17.10 | 27.17 |
| d33 | 26.72 | 17.77 | 0.40 |

Zoom lens group data

| | Amount of movement of group (with respect to TELE) | | |
|---|---|---|---|
| | MIDDLE | WIDE | Focal length |
| Gr1 | 0.00 | 0.00 | −35.26 |
| Gr2 | 13.51 | 33.24 | 55.05 |
| Gr3 | −4.05 | 3.71 | −67.65 |
| Gr4 | −1.06 | 6.24 | −1717.83 |
| Gr5 | 8.95 | 26.32 | 158.82 |
| Gr6 | 0.00 | 0.00 | 75.21 |

Example 5

Unit: mm

Surface data

| i | CR | d | nd | νd |
|---|---|---|---|---|
| 1 | 55.97 | 3.30 | 1.76 | 40.10(L1/Gr1) |
| 2 | 31.08 | 14.48 | | |

-continued

| | | Unit: mm | | |
|---|---|---|---|---|
| 3* | 54.28 | 2.86 | 1.53 | 56.38(L2/Gr1) |
| 4 | 30.19 | 16.80 | | |
| 5 | −101.44 | 2.44 | 1.67 | 47.20(L3/Gr1) |
| 6 | 147.30 | Variable | | |
| 7 | 167.05 | 6.90 | 1.52 | 64.20(L4/Gr2) |
| 8 | −67.55 | 21.97 | | |
| 9 | 72.02 | 3.14 | 1.79 | 43.93(L5/Gr2) |
| 10 | 297.85 | Variable | | |
| 11 | −81.43 | 1.53 | 1.50 | 81.61(L6/Gr3) |
| 12 | 80.96 | Variable | | |
| 13 | ∞ | 6.86 | | (ST/Gr4) |
| 14 | −34.38 | 1.36 | 1.62 | 63.39(L7/Gr4) |
| 15 | 38.21 | 0.01 | 1.55 | 47.00 |
| 16 | 38.21 | 6.34 | 1.67 | 32.17(L8/Gr4) |
| 17 | −56.86 | Variable | | |
| 18 | −549.87 | 6.77 | 1.50 | 81.61(L9/Gr5) |
| 19 | −27.10 | 2.65 | | |
| 20 | −23.29 | 1.62 | 1.83 | 37.34(L10/Gr5) |
| 21 | −85.46 | 0.22 | | |
| 22 | 69.86 | 7.52 | 1.50 | 81.61(L11/Gr5) |
| 23 | −38.03 | 0.24 | | |
| 24 | 237.78 | 1.75 | 1.83 | 37.34(L12/Gr5) |
| 25 | 33.78 | 3.12 | | |
| 26 | 41.93 | 8.90 | 1.50 | 81.61(L13/Gr5) |
| 27 | −51.70 | Variable | | |
| 28 | 54.57 | 4.20 | 1.50 | 81.61(L14/Gr6) |
| 29 | ∞ | 11.00 | | |
| 30 | ∞ | 54.00 | 1.52 | 64.20(PR) |
| 31 | ∞ | 5.00 | | |
| 32 | ∞ | 1.05 | 1.49 | 70.44(CG) |
| 33 | ∞ | 0.70 | | |
| 34 (IM) | | | | |

| | | Aspheric surface data | | |
|---|---|---|---|---|
| i | K | A4 | A6 | A8 | A10 |
| 3 | 0.0000E+00 | 3.7854E−06 | 3.3383E−09 | −2.9234E−12 | 5.4686E−15 |

| | Various data | | |
|---|---|---|---|
| | TELE | MIDDLE | WIDE |
| Focal length | 25.45 | 17.99 | 12.72 |
| Zoom ratio | 2.00 | | |
| Image height | 8.50 | | |
| Half angle ω | 18.47 | 25.29 | 33.76 |
| F number | 2.57 | 2.30 | 2.00 |
| BF | 53.01 | | |
| Entire lens length | 234.78 | | |
| φ34 | −0.01578 | −0.01696 | −0.01723 |
| Inter-group space | | | |
| d6 | 20.96 | 30.35 | 50.13 |
| d10 | 37.22 | 21.08 | 5.97 |
| d12 | 3.17 | 29.38 | 35.20 |
| d17 | 1.02 | 1.66 | 8.93 |
| d27 | 38.85 | 18.75 | 1.00 |

| | Zoom lens group data | | |
|---|---|---|---|
| | Amount of movement of group (with respect to TELE) | | |
| | MIDDLE | WIDE | Focal length |
| Gr1 | 0.00 | 0.00 | −28.26 |
| Gr2 | 9.39 | 29.17 | 58.77 |
| Gr3 | −6.75 | −2.08 | −81.19 |
| Gr4 | 19.46 | 29.94 | −271.99 |
| Gr5 | 20.10 | 37.85 | 77.32 |
| Gr6 | 0.00 | 0.00 | 109.12 |

TABLE 1

| Conditional expression | | Example 1 | | Example 2 | | Example 3 |
|---|---|---|---|---|---|---|
| (1) | bf/fw | 4.174 | | 4.167 | | 4.158 |
| (2) | dx/f2 | 0.588 | | 0.463 | | 0.576 |
| (3) | φ34 min/φ34 max | 1.0284 | | 1.1124 | | 1.0094 |
| (4) | θg_F + 0.001682 · nd L6 | 0.676 | L6 | 0.676 | L5 | 0.676 |
| (5) | nd | 81.610 | | 81.610 | | 81.610 |
|  | θg___F | 0.0375 | | 0.0375 | | 0.0375 |
| (4) | θg_F + 0.001682 · nd L7 | 0.647 | L7 | 0.647 | L6 | 0.647 |
| (5) | nd | 63.39 | | 63.39 | | 63.39 |
|  | θg___F | 0.0060 | | 0.0060 | | 0.0060 |

| Conditional expression | | Example 4 | | Example 5 | |
|---|---|---|---|---|---|
| (1) | bf/fw | | 4.343 | | 4.168 |
| (2) | dx/f2 | | 0.604 | | 0.496 |
| (3) | φ34 min/φ34 max | | 1.0017 | | 1.0919 |
| (4) | θg_F + 0.001682 · nd L9 | | 0.693 | L6 | 0.676 |
| (5) | nd | | 95.100 | | 81.610 |
|  | θg___F | | 0.0564 | | 0.0375 |
| (4) | θg_F + 0.001682 · nd L10 | | 0.693 | L7 | 0.647 |
| (5) | nd | | 95.10 | | 63.39 |
|  | θg___F | | 0.0564 | | 0.0060 |

Although the present invention has been described and illustrated in detail, it is clearly understood that the same is by way of illustrated and example only and is not to be taken by way of limitation, the scope of the present invention being interpreted by terms of the appended claims.

What is claimed is:

1. A projection lens comprising a first lens group having negative refractive power, a second lens group having positive refractive power, a third lens group having negative refractive power, a fourth lens group having negative refractive power, a fifth lens group having positive refractive power, and a sixth lens group having positive refractive power, in sequence from an enlargement conjugate side, the projection lens performing magnification by changing the spacing between the lens groups, wherein
at the time of magnification from the telephoto end to the wide-angle end, the second, third, fourth, and fifth lens groups are moved,
an aperture stop is arranged between the surface of the third lens group closest to a reduction conjugate side and the surface of the fifth lens group closest to the enlargement conjugate side, and
the following conditional expressions (1) and (2) are satisfied:

$$4.0 < bf/fw \quad (1)$$

$$0.462 < dx/f2 < 0.605 \quad (2)$$

where
bf: Air-converted back focus from the rearmost lens surface to an image plane,
fw: Focal length of the entire projection lens at the wide-angle end,
dx: Amount of movement of the second lens group at the time of magnification from the telephoto end to the wide-angle end, and
f2: Focal length of the second lens group.

2. The projection lens according to claim 1, wherein the following conditional expression (3) is satisfied:

$$1.000 < \phi 34 min/\phi 34 max < 1.160 \quad (3)$$

where
φ34min: Minimum value of synthetic refractive power of the third lens group and the fourth lens group in the entire magnification range, and
φ34max: Maximum value of synthetic refractive power of the third lens group and the fourth lens group in the entire magnification range.

3. The projection lens according to claim 1, wherein at the time of magnification from the telephoto end to the wide-angle end, the third lens group moves to the enlargement conjugate side and then makes a U turn to the reduction conjugate side.

4. The projection lens according to claim 1, wherein the third lens group consists of lenses with negative refractive power.

5. The projection lens according to claim 1, wherein at least one of the lenses with negative refractive power included in the third lens group and the fourth lens group satisfies the following conditional expressions (4) and (5):

$$0.645 < \theta g\_F + 0.001682 \times vd < 0.695 \quad (4)$$

$$60 < vd < 100 \quad (5)$$

where
θg_F: Partial dispersion ratio of lens material $$\theta g\_F = (Ng - NF)/(NF - NC)$$

Ng: Refractive index relative to g line,
NF: Refractive index relative to F line,
NC: Refractive index relative to C line, and
vd: Abbe number of lens material.

6. The projection lens according to claim 1, wherein the fourth lens group includes cemented lenses including a lens with negative refractive power and a lens with positive refractive power in sequence from the enlargement conjugate side.

7. The projection lens according to claim 1, wherein the first lens group includes an aspherical lens.

8. The projection lens according to claim 7, wherein the material for the aspherical lens included in the first lens group is a resin material.

9. A projector comprising:
an image forming element that forms image light; and
the projection lens according to claim 1 that enlarges and projects the image light.

* * * * *